United States Patent [19]

Camras

[11] 3,946,147

[45] Mar. 23, 1976

[54] MAGNETIC RECORDING SYSTEM

[75] Inventor: Marvin Camras, Glencoe, Ill.

[73] Assignee: IIT Research Institute, Chicago, Ill.

[22] Filed: Mar. 26, 1975

[21] Appl. No.: 562,145

Related U.S. Application Data

[63] Continuation of Ser. No. 347,649, April 4, 1973, abandoned.

[52] U.S. Cl. ..................... 178/5.6; 360/33; 360/66
[51] Int. Cl.² ............................................ H04N 5/78
[58] Field of Search ........... 178/5.6, 69.5 F; 360/33, 360/66; 358/4, 7, 9

[56] References Cited
UNITED STATES PATENTS 3,502,795   3/1970   Camras ................................... 358/9
3,526,727   9/1970   Rainer ................................... 360/66

*Primary Examiner*—Howard W. Britton
*Attorney, Agent, or Firm*—Hill, Gross, Simpson, Van Santen, Steadman, Chiara & Simpson

[57] ABSTRACT

A longitudinal scan transducing apparatus for use with a television receiver comprising a magnetic transducer head having transverse conductors for supplying high frequency bias, high frequency bias synchronized with the horizontal line rate, head shifting and tape reversal features, and television set adapter circuitry for supplying a wide-band video signal and for stabilizing reproduced sync signals.

6 Claims, 21 Drawing Figures

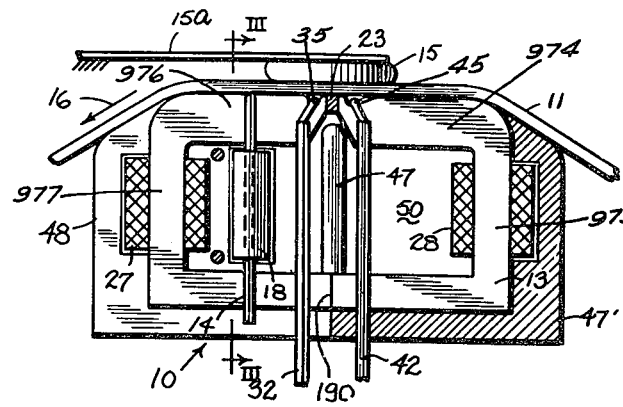
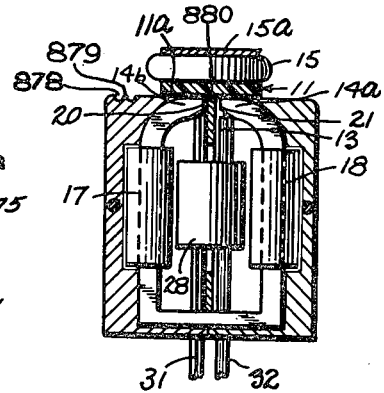
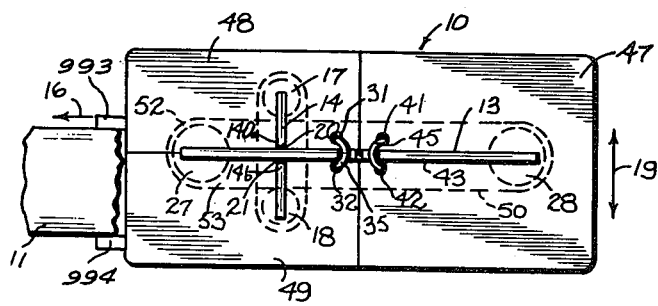
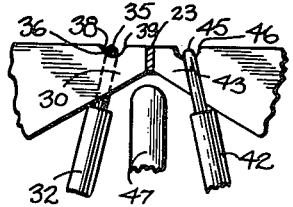
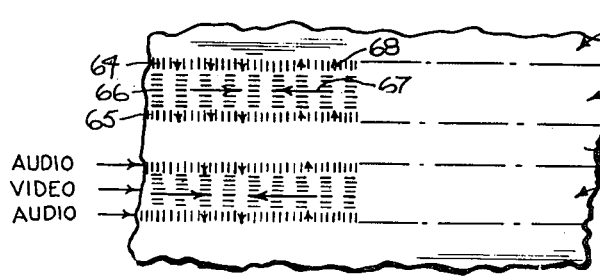
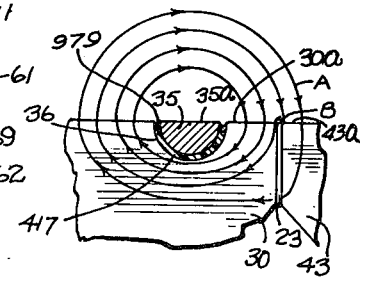

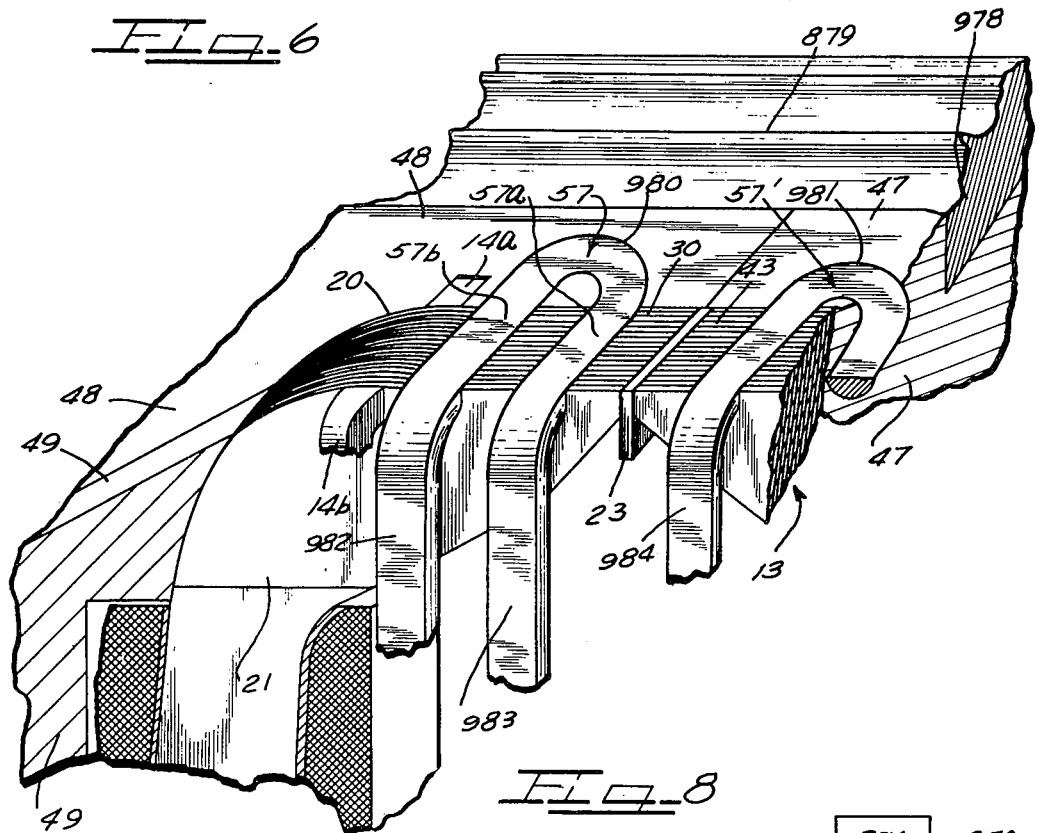
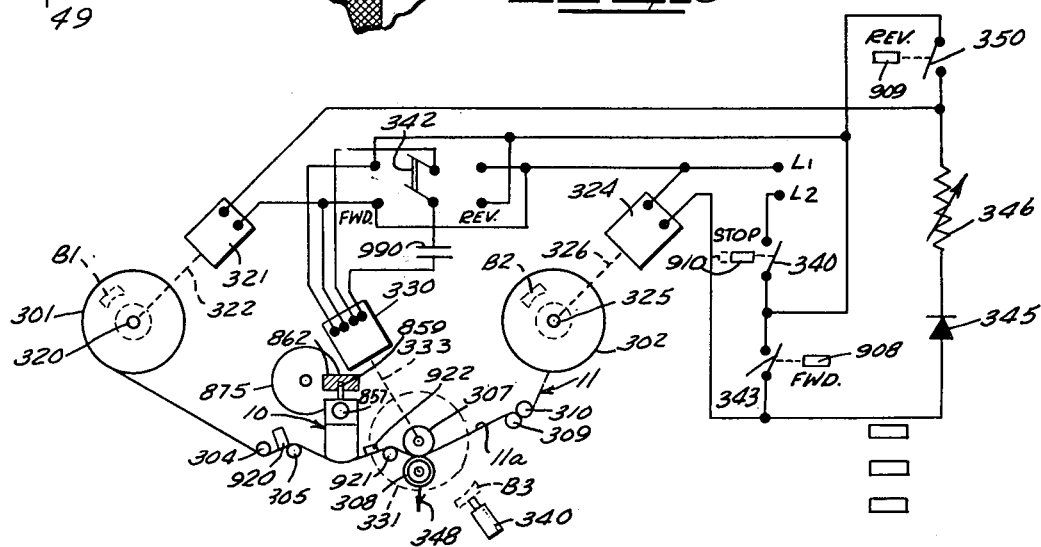

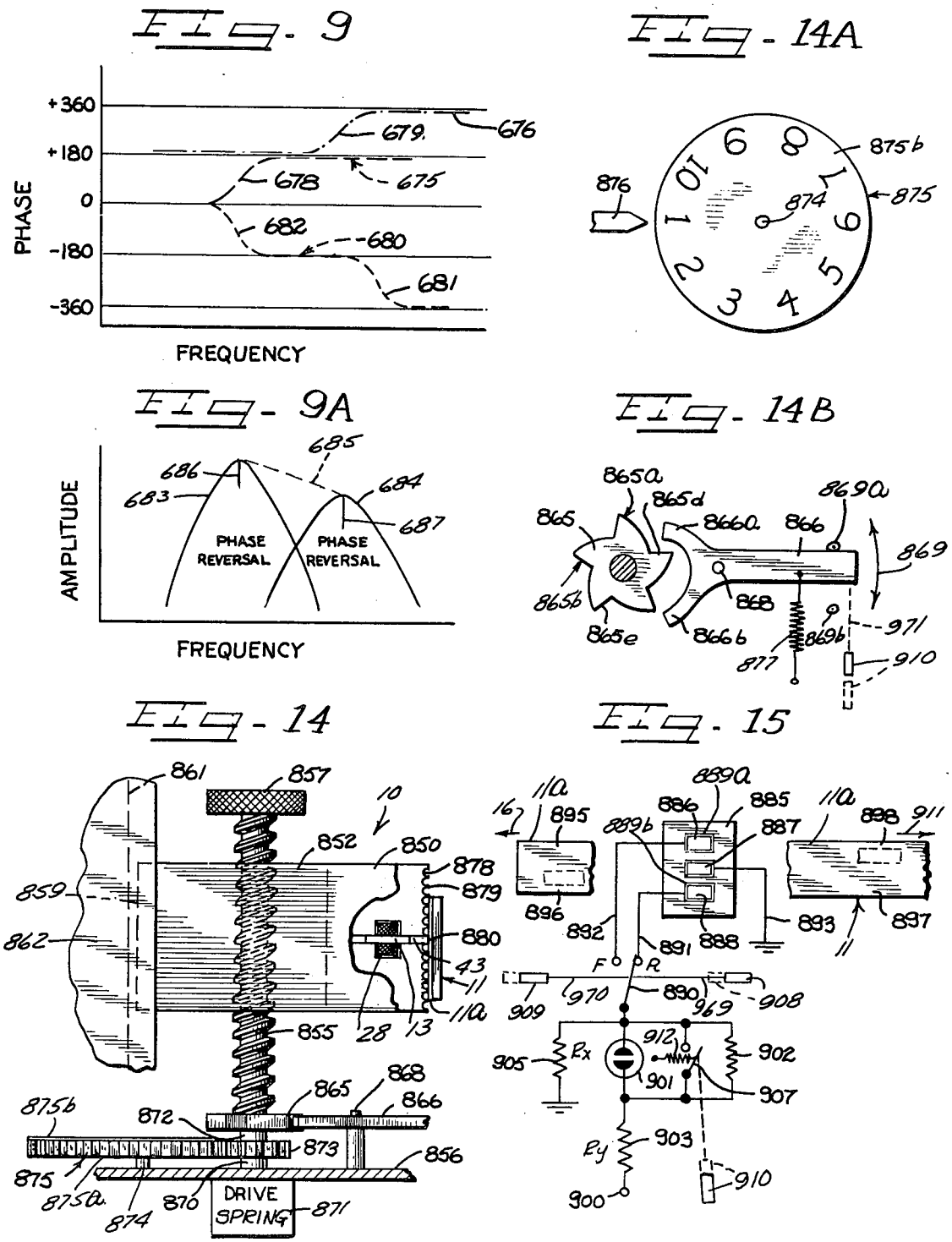

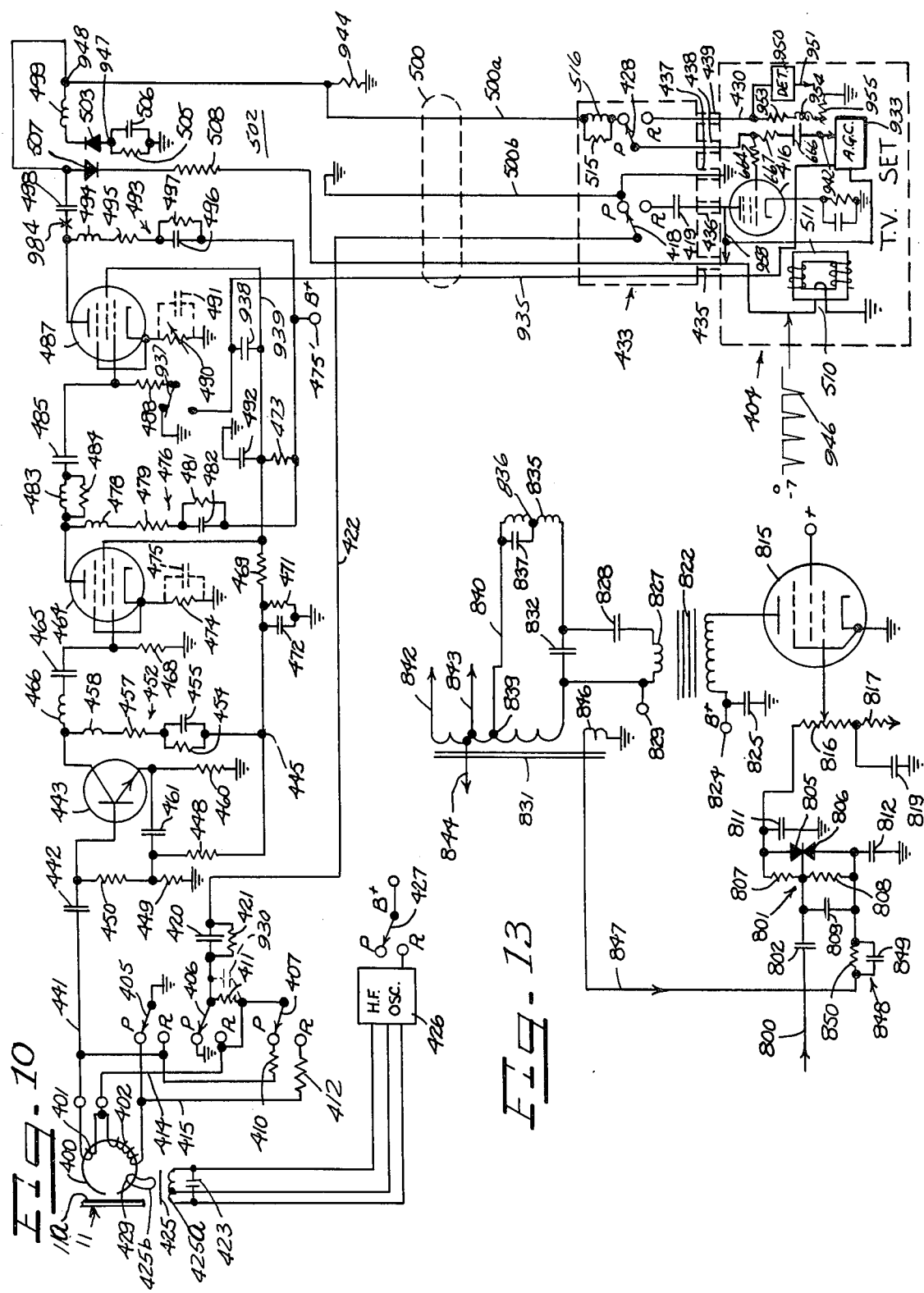

MAGNETIC RECORDING SYSTEM

CROSS REFERENCES TO RELATED APPLICATIONS:

The present application is a continuation of my pending application Ser. No. 347,649 filed Apr. 4, 1973, now abandoned.

Reference is made to my earlier applications Ser. No. 344,075 filed Feb. 11, 1964 (now U.S. Pat. No. 3,681,526 issued Aug. 1, 1972), Ser. No. 401,832 filed Oct. 6, 1964 (now U.S. Pat. No. 3,495,046 issued Feb. 10, 1970), Ser. No. 439,340 filed Mar. 12, 1965 (now U.S. Pat. No. 3,502,795 issued Mar. 24, 1970), Ser. No. 528,934 filed Feb. 21, 1966 (now abandoned) Ser. No. 848,992 filed Aug. 11, 1969 (now abandoned), Ser. No. 62,601 filed Aug. 10, 1970 (now U.S. Pat. No. 3,683,107 issued Aug. 8, 1972), Ser. No. 199,977 filed Nov. 18, 1971 (now U.S. Pat. No. 3,824,619 issued July 16, 1974) and Ser. No. 213,696 filed Dec. 29, 1971 (now abandoned).

This invention relates to an improved transducer system and method for recording and/or reproducing electrical signals particularly both audio and video signals. Also, this invention relates to an improved transducer system which is adapted to receive intelligence signals to be recorded from a television receiver during a recording operation and/or plays back the recorded intelligence signals by means of a standard television receiver during a playback operation.

In one type of magnetic recording system, a lengthy magnetizable record medium, such as a tape having a magnetizable layer, is drawn across an electromagnetic transducer head assembly at substantially a uniform linear velocity. A preferred head assembly for such a system includes a magnetic core having a non-magnetic gap over which the medium passes and which is provided with suitable elements to produce a magnetic field across the gap which field varies in accordance with a first intelligence signal. A second form of intelligence may be impressed on the magnetizable record medium transverse and on either side of the first intelligence signal. This is accomplished by a second magnetic core so positioned and arranged as to provide two non-magnetic gaps over which the medium passes. The pole portions of the first core are preferably so positioned and arranged that the medium passes over first one pole and then across the gap and then over the other pole, while the pole portions of the second core are preferably so positioned and arranged that the medium simultaneously passes over the two transverse gaps.

The present invention is also concerned with a video playback system wherein the record medium travels at relatively high speeds and the video signal is recorded on each of a substantial number of narrow audio-video channels extending lengthwise of the direction of travel of the record medium. An embodiment in accordance with the present invention is capable of producing an hour or more of recording on a 7 inch reel of ¼ inch wide magnetic record tape while avoiding the complexity and expense of a rotating type scanning head such as previously employed in the art.

During the recording operation, current is caused to flow in the exciting elements in accordance with the time variation of the intelligence to produce a time-varying magnetic field in the core. The lengthy magnetizable medium is subjected to an influence of this field as it is drawn therethrough, and magnetization is imparted to incremental lengths of the medium in accordance with the time variations of the intelligence, thus causing variations in the degree of magnetization of the medium along its length in accordance with the time variations of the intelligence. Also during recording of audio-video intelligence signals and sweep synchronizing signals an appropriate high frequency biasing signal is preferably applied to the transducer head. A similar arrangement may however be used with direct current bias, or in special cases without bias.

During reproduction, the lengthy magnetizable medium is drawn across the same or a similar head assembly to set up a flux in the core member thereof in accordance with the degree of magnetization of the medium along successive incremental lengths as it is passed across the gap of the magnetic core. The resultant time varying flux induces a voltage in the coil or other flux sensitive means with which the flux is coupled. This voltage may be amplified and suitably reproduced to provide audio and video intelligence and synchronizing signals suitable for the operation of a commercially available television set.

The present invention is also concerned with providing a transducer system having a sufficiently broad frequency response as to enable a high degree of accuracy in the reproduction of video signals applied thereto. To realize the full advantages afforded by the electromagnetic transducer head, improved electronic circuitry is also provided. For example, the electromagnetic transducer head may be provided with a high frequency bias winding on either side of the non-magnetic gap used for recording video intelligence. Although other methods of providing high frequency signals to an electromagnetic transducer head are well known in the art, the method employed by the present invention allows a higher a.c. bias frequency than could otherwise be used which gives a lower noise level and avoids "beating" with the signal. This is of special advantage with video and other wide band recording. The transducer head which is preferably employed in the system of the present invention shows a substantial savings in space and material while maintaining the same or better results than electromagnetic transducer heads constructed heretofore.

Since the electromagnetic transducer head is to be used in a recording system having a plurality of longitudinal channels impressed on the record medium, the head is advantageously provided with substantially symmetrical recording properties so that recording can take place in each direction of movement of the record medium across the head.

The present invention is also concerned with providing means for automatically and selectively positioning an electromagnetic transducer head in scanning relation to successive channels as the direction of movement of a lengthy record medium is successively reversed. Preferably, means are also provided so that the transducer head may be positioned manually with respect to a desired channel on the record medium, and a suitable tape channel indicator is incorporated with and responsive to transducer head movement.

The transducer system of the present invention is also concerned with an end-of-tape control means whereby tape movement may be stopped and reversed at desired intervals.

The tape sensing system of the present invention is also concerned with providing improved electronic circuitry having a broad frequency response and capable of receiving intelligence signals from, and applying intelligence signals to a television receiver and which utilizes existing television receiver circuitry with a minimum of modification.

It is therefore an object of the present invention to provide a novel method and means for recording intelligence on a record medium and/or reproducing recorded intelligence.

Another object of the present invention is to provide a novel electromagnetic transducer head.

Yet another object of the present invention is to provide a novel electromagnetic transducer head which is constructed and arranged so as to scan an audio track on either side of the video track.

Another object of the present invention is to provide a novel means by which effective high frequency bias in the megacycle range can be applied to a magnetic transducer head to improve the characteristics of video recording. This means can also be used with heads or other lower frequency recordings, particularly to allow a very high frequency bias which is advantageous in achieving lowest noise levels.

Another object of the present invention is to provide a transducer head of improved symmetrical construction so as to be operable in either direction of travel of the record medium.

Still another object of the present invention is to provide an improved means for recording and playback of video signals having a wide frequency response.

Yet another object of the present invention is to provide novel means by which hum-bucking is provided during playback of the record medium.

A further object is to provide a playback head for television signals having a means for suppressing crosstalk between adjacent audio and video tracks.

A more specific object of the present invention is to provide an improved electromagnetic transducer head consisting of two or more magnetic cores, all of which lie in different planes and which may or may not have electromagnetic interaction therebetween.

A further more specific object of the present invention is to provide a novel transducer system in which the intelligence applied thereto may be received directly from a commercially available television set, and in which the playback signal from the transducer system may be applied to the same or a different commercially available television set.

A still further more specific object of the present invention is to provide a transducer system of improved characteristics for recording intelligence with high frequency components of a magnitude such as is required for proper reproduction on commercial television receivers and the like.

Other objects, features and advantages of the present invention will be apparent from the following detailed description taken in connection with the accompanying drawings.

BRIEF DESCRIPTION OF THE ACCOMPANYING DRAWINGS

FIG. 1 is a somewhat diagrammatic view of an electromagnetic transducer head with certain parts broken away and indicating an embodiment in accordance with the present invention;

FIG. 2 is a somewhat diagrammatic top plan view of the embodiment of FIG. 1;

FIG. 3 is a somewhat diagrammatic vertical sectional view of the embodiment of FIG. 1;

FIG. 4 is a diagrammatic fragmentary plan view of a magnetic record tape and illustrates diagrammatically the recorded fields of a composite audio-video channel and the relationship of adjacent channels having such recorded fields.

FIG. 5 is an enlarged fragmentary view of the magnetic recording gap region of the head of FIG. 1;

FIG. 5A is a diagrammatic view showing preferred details of construction for the embodiment of FIG. 5 and illustrating the magnetic field components. produced by energization of one of the cross field conductors of FIG. 5;

FIG. 6 is an enlarged fragmentary view of an embodiment of the present invention showing another arrangement of biasing conductors for the head of FIG. 1;

FIG. 8 is a diagrammatic plan view of a tape transport system for the embodiments of FIGS. 1–7;

FIGS. 9 and 9A are graphical representations showing the phase shift obtained from respective video coils of the transducer head shown in FIGS. 1–3 as the frequency applied thereto increases, and showing the output as a function of frequency, respectively;

FIG. 10 is a schematic wiring diagram showing circuit connections and component arrangement used during a playback operation with the recording system of FIG. 8;

FIG. 13 is a schematic wiring diagram of an alternative horizontal sweep output circuit for use in place of the circuit of FIG. 12;

FIG. 14 is a diagrammatic elevational view of a transducer head positioning and tape channel indicating device for use in the transducer system of FIG. 8;

FIG. 14A and 14B are diagrammatic plan views showing details of the embodiment of FIG. 14;

FIG. 15 is a somewhat diagrammatic representation of an end-of-tape signalling arrangement;

Figure 16:
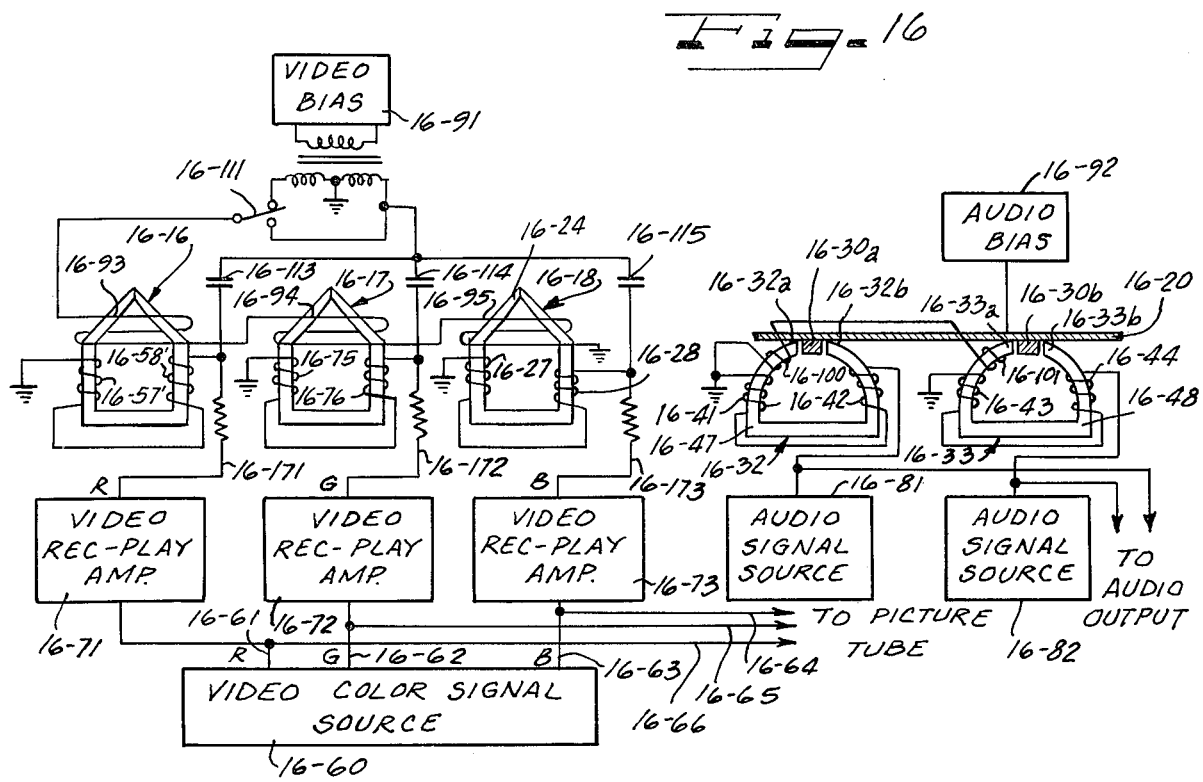
Figure 17:
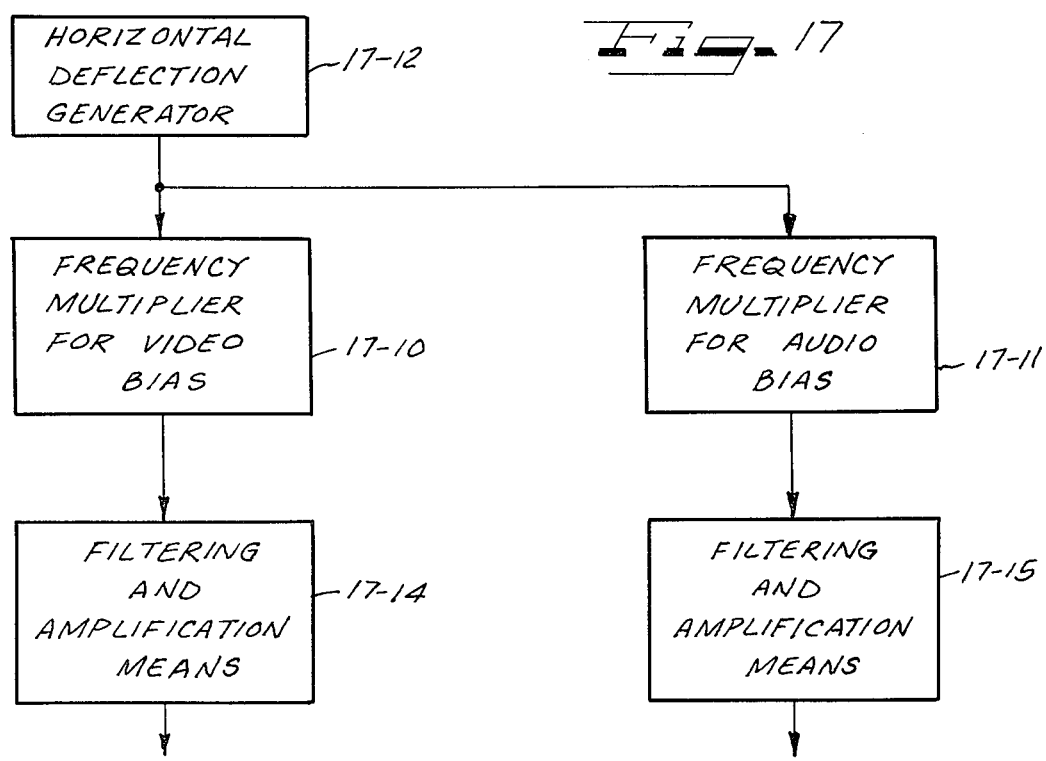

FIG. 16 is a diagrammatic view illustrating a circuit diagram of a transducer system for color signals and associated audio signals and corresponding to the third figure of my U.S. Pat. No. 3,502,795; and FIG. 17 is a diagrammatic view showing circuitry for comprising the video bias source and the audio bias source of FIG. 16 (as described in U.S. Pat. No. 3,502,795, column 4, lines 19–30).

DESCRIPTION OF THE PREFERRED EMBODIMENTS

FIG. 1 illustrates a composite audio-video magnetic transducer head generally designated by reference numeral 10, and which is energized to produce a composite video and synchronizing track between two audio tracks on the record medium 11 as described hereinbelow. The composite head is constructed and arranged so as to have an outer protective casing 12 surrounding the magnetic core members 13 and 14 and the electric windings thereon. The magnetic core member 14 is utilized for the recording the reproduction of the audio tracks and is provided with a pair of windings 17 and 18 which, by way of example, can have 1500 turns of conductive material each to provide an overall substantially flat frequency response over the audio frequency range. The non-magnetic gap spacers 20 and 21, FIG. 2, which are disposed between the end portions 14a and 14b of the magnetic core 14 and portions of the side walls of the magnetic core 13 are so arranged as to produce an audio frequency record track of 2 mils width on either side of the magnetic core member 13. Holding the record medium 11 in movable contact with the transducer head 10 is a pressure pad 15 of resilient material which is movable toward and away from the transducer head by suitable mechanical or electromechanical means and in operative position is resiliently urged toward the head.

Provided between the polar portions of the magnetic core member 13 is a non-magnetic gap spacer 23. The gap defined by the gap spacer 23 provides a video signal track midway between the audio signal tracks. By way of example, the gap spacer 23 may have a dimension of 50 micro-inches in the direction of movement of the record medium.

The magnetic core member 13 has located thereon video frequency signal coils 27 and 28 which have different and overlapping frequency characteristics, thereby providing the broader frequency response required for video signals. By way of example, the coil 27 may comprise 1000 turns of conductive material while the coil 28 may comprise 200 turns of a similar conductive material, and one lead of each coil 27 and 28 may be connected together while the output signal is obtained from the other leads of the respective coils.

In the preferred embodiment, however, only the coil having 200 turns is used for recording video signals, while the coil having 200 turns together with the coil having 1000 turns are used in series for playback of the video signal. To further increase the frequency response of the transducer head during playback, coils 27 and 28 are connected so that their induced voltages at low frequencies are opposing each other. The coil 27 will provide an adequately strong signal output at the lower frequencies because the opposing output of coil 28 is too small to appreciably affect the output of coil 27. However, at the high frequencies, above the resonance of coil 27 (with its own and with circuit capacitances), the phase of the output signal from the coil 27 is shifted by an amount approaching 180° and thus adds to the output of the high frequency coil 28, which is below its own resonance at this higher frequency. If still a broader frequency response is required from the transducer head 10, a third coil may be added to the magnetic core 13, which may have fewer turns than coil 28 and which will also be assisted by the phase reversal of the coils resonant at lower frequencies. To still further increase the high frequency response of this transducer head 10, a ferrite shunt 47 may be placed centrally of the magnetic core 13 with one end thereof in proximity to the gap 23.

The transducer head 10 has extending along the opposite side walls of the pole piece 30, FIG. 5, a pair of conductors 31 and 32, which are preferably No. 22 A.W.G. enamel coated conductors. Connected between the upper ends of conductors 31 and 32 is a No. 32 to No. 36 A.W.G. conductor 35, which is inserted into a recessed portion 36 of the pole piece 30. The conductor 35 has a diameter which is about 100 times the longitudinal dimension of the gap 23. The recessed portion 36 is provided with rounded edges 38 and 39 which serve to prevent unwanted recording fields due to the conductor 35 at the corners of the recessed portion 36. A pair of conductors 41 and 42 are provided along the side walls of the pole piece 43 and have connected between their upper portions a conductor 45, which is inserted into a groove 46 of the pole piece 43. The conductors 35 and 45 and preferably polished to give a continuous surface for the tape as indicated at 35a in FIG. 5A.

The conductors 35 and 45 are symmetrically arranged on the pole pieces 30 and 43 in such a manner as to provide symmetrical recording characteristics in either direction of travel of the record medium. Also the conductors 35 and 45 can be arranged in such a manner as to allow the application of biasing currents of lower amplitude to both conductors 35 and 45 simultaneously while the record medium moves in either direction.

Preferably one or the other of conductors 35 or 45 is energized, depending on the direction of travel of the record medium, by a high frequency bias current which by way of example, may have an amplitude of approximately 1 ampere at a frequency between 3 and 15 megacycles; preferably a frequency is used which itself and the harmonics of which will not interfere with the operation of the television set. During one mode of operation, the conductor 35 may have generated thereabout a magnetic field which enters the pole piece 43 substantially at right angles thereto as indicated in FIG. 5A. This establishes an arc shaped magnetic field in the region above the gap as indicated at A in FIG. 5A, modified by a semicircular field of greater curvature due to the component of flux of the conductor which is carried by the core which traverses the gap, such as indicated at B in FIG. 5A. The magnetic field generated by the intelligence signal to be recorded resembles the B component. Therefore a composite magnetic field is produced by both the bias magnetic field and the intelligence signal magnetic field. The composite magnetic recording field has a relatively sharp gradient as to the longitudinal bias frequency component thereof at the trailing side of gap 23. An alternative method for applying high frequency bias to the signal magnetic field is to introduce the high frequency signal to the video recording coils 27 and 28 and this component may be in addition to the field supplied by the conductor 35. If both fields are used it may be advantageous to select the polarity of the two components or to shift the phase of one with respect to the other.

The flux produced by the bias conductor 35 is preferably of a frequency at least several times that of the intelligence frequency. Alternatively, a direct current bias may be supplied to the conductor 35 and/or windings 27 and 28 so as to cause the video frequency component of the applied signal to be recorded on the relatively linear, positively sloping portion of the Br versus H curve of the magnetic material of the tape 11. In this case the tape may be presaturated before reaching the recording head. The high frequency bias for the audio portion of the transducer head 10 is obtained from the horizontal sweep generator of the television set and is applied directly to the audio coils 17 and 18.

Alternately, the biasing conductors of the present invention may be constructed and arranged in a manner as shown in FIG. 6. The magnetic core member 13 has located at each side of the recording gap 23 a pair of transverse slots 55 and 56. Inserted in slots 55 and 56 is a rectangular cross-sectioned conductor 57 arranged as shown in FIG. 6. When a current is passed through the conductor 57 a magnetic field is produced about the conductor 57 in such a manner as to provide a cross field biasing effect in the region of recording gap 23. The magnetic cross field biasing which is produced in the region of the gap 23 is proportioned to the difference between the magnetic field produced by conductor portion 57a and the magnetic field produced by conductor portion 57b. That is, the magnetic field in the region of gap 23 in oersteds (H) is equal to $$H = \frac{0.4 I}{R_1} - \frac{0.4 I}{R_2}$$

wherein $I$ is equal to the amount of current in amperes passing through the conductor portions 57a and 57b and $R_1$ and $R_2$ are the respective distances of the conductor portions 57a and 57b from the gap 23 in centimeters.

One of the primary advantages realized by the loop configuration of biasing conductor 57 is that a greater ratio of cross field m.m.f. to recording gap m.m.f. is obtainable. In certain practical configurations the recording gap m.m.f. would otherwise be too great. Another advantage is that the cross field falls off as $1/R^2$ instead of $1/R$, where the average distance R from conductors to gap is large. This gives a better cross field and reduces its erasing tendencies beyond the record gap.

The inverse square relation may be seen from:

$$H = \frac{.4 I}{R_1} - \frac{.4 I}{R_2} = \frac{.4 R_2 - .4 R_1}{R_1 R_2} \quad (I)$$

$$= \frac{.4 (R_2 - R_1)}{R_1 R_2} \quad (I)$$

In a given head the spacing between the conductors is $R_2 - R_1$ which is a fixed constant $A$. When $R_1$ and $R_2$ becomes large compared to their spacing they may each be replaced in the denominator by their average $R$. We then have $$H = \frac{.4 A}{R^2} \quad (I)$$

showing that $H$ varies inversely with $R^2$. This compares with a single conductor where $$H = \frac{.4 I}{R}$$

Similarly if the conductors are looped back and forth $n$ times, the field falls off as $1/R^n$.

In the above examples the core permeability is assumed infinite, so that the field about the conductors above the head is twice as great as if the core were absent. By way of example, the conductor portions 57a and 57b may each be 4 mils across, and the distance from gap 23 to conductor portion 57a may be 4 mils, the distance between conductor portions 57a and 57b also being 4 mils. Although the hairpin 57 is shown herein as being a rectangular cross section conductor it is not to be constructed in a limiting sense. By using a rectangular conductor, a greater cross sectional area is realized thereby allowing a larger current to flow in the conductor portions 57a and 57b. However, a circular or ribbon cross section conductor will work equally well. Also, the hairpin loop construction as shown in FIG. 6 is not limited to use in recording video intelligence; it can work equally advantageously on the magnetic core 14, FIG. 3, for the recording of audio intelligence. When high frequency biasing of audio intelligence is obtained in this manner, a greatly improved signal to noise ratio can be had, biasing frequencies in the megacycle range being practical. In the preferred embodiment of the present invention the magnetic core member 13 may have located thereon slots and loop hairpins, similar to hairpin 57, on both sides of the recording gap 23. In this manner recording of video intelligence is obtainable on one track while the record medium moves in the direction of arrow 58 and then on another track while the record medium moves in the direction opposite to the direction of arrow 58.

Another advantage realized by the use of the multiple cross field conductors such as 57a and 57b is that the concentrated magnetic flux in the area 59, between conductor portions 57a and 57b, serves to erase a given channel of the record medium before it passes over the recording gap 23.

The net bias field produced by the conductor portions 57a and 57b is thus superimposed on the flux produced by the video coils 27 and 28 in the region of the record gap 23. Because of the very close proximity of the erase flux, in area 59, to the record gap 23 it will be noted that there is a semicircular field set up by the combined fields about conductor portions 57a and 57b which extends over into the region of the record gap 23. It can be seen therefore that the loop hairpin configuration shown in FIG. 6 serves not only to erase the record medium just before recording thereon but also to provide an advantageous biasing field in the region of record gap 23.

As shown in FIG. 2, the outer casing member 12 can be constructed of three portions 47', 48 and 49. Case member 47' is provided with a cavity 50 to receive one end of the magnetic core pole piece 43 and coil 28, while the case members 48, 49 have symmetrical cavities 52 and 53 to receive the audio frequency magnetic core 14, audio coils 17 and 18, part of the video core 30 and video coil 27. Although the electromagnetic transducer head 10 has both audio and video recording sections and also provides a high frequency bias cross field, the construction is such as to allow the transducer head 10 to be of minimum physical dimensions.

FIG. 4 illustrates a portion of the magnetic record medium 11, which in its entirety may be ¼ inch wide and form a 7 inch diameter reel of tape. The tape may have recorded thereon a series of ten channels two of which are indicated at 61 and 62. Channel 61 comprises two audio tracks 64 and 65 and one video track 66 between the audio tracks. The recorded fields of the video track 66 are directed longitudinally of the direction of movement of the record medium 60 as indicated by the arrow 67, while the recorded fields of the audio tracks 64 and 65 are preferably directed at right angles to the direction of travel of the record medium 60 as indicated by arrow 68. By way of example, the width of the audio tracks 64 and 65 may be 2 mils each, while the width of the video track 66 may be 15 mils, providing a total width of 19 mils for the tracks recorded on one channel of the record medium 11. The unused portion of the tape between adjacent channels such as 61 and 62 is represented by the blank area 69 and is 6 mils in width. With the dimensions mentioned hereinabove the center to center distance between tracks is 0.025 inches thereby providing ten channels on a ¼ inch tape. To obtain the necessary channels from the tape 11, the transducer head 10 is moved in the directions indicated by arrow 19, which is transverse to the direction of tape travel.

In order to produce a video track portion 66 having a width of about fifteen mils, the width of the magnetic pole pieces 30 and 43, FIG. 5, and the transverse dimension of the gap 23 defined by the pole pieces should be approximately fifteen mils. The transverse gap, defined between poles 14a and 14b of audio core 14 and the adjacent portion of video core 13, should have a dimension at right angles to the direction of travel of the record medium of about two mils to provide audio tracks of two mils width as described in connection with FIG. 1. The thickness dimension of the pole 14 which dimension is in the direction of tape travel is preferably selected to provide a null in response to recorded wavelengths corresponding to the horizontal sweep frequency of the video signal being recorded. Thus if $\lambda$ is the recorded wavelength on the record tape corresponding to the line frequency and $n$ is an integer, the effective thickness of the pole 14 in the direction of travel of the record medium should be $n\lambda$. This gives a null in the response of the head of FIG. 1 in the audio circuit which tends to prevent interferences between the audio and video signals on the tape. If the thickness of the pole 14 is presented by the letter W, the tape velocity by the letter V, and it is assumed that the line frequency is 15,750 cycles per second, then W equals $$\frac{nV}{15,750.}$$

The record tape 11 is driven in the direction of the arrow 16 across the transducer head of FIG. 2 by any suitable tape transport mechanism. By way of example, if a ¼ inch wide tape of audio grade material is moved at a speed of 110 inches per second, with 20 tracks and a 7 inch reel, the playing time will be between 40 and 120 minutes depending on the tape thickness. Picture quality will be improved further by proper use of microgap and cross field heads. Higher tape speeds are also feasible since the playing time is still adequate aven when reduced by a factor of 2 or 3.

The thickness dimension of the audio recording poles 14a and 14b in FIG. 2 is selected to give a null in response at the line frequency so as to tend to prevent interference between the audio and video signals on the tape during playback. The audio circuit bias may be derived from the television receiver sweep circuits so as to avoid interference and eliminate the need for an oscillator. In the specific circuit illustrated, a capacitor can be used to tune the head windings 17 and 18 to resonance preferably at a harmonic of the sweep frequency, for example 47.25 kilocycles per second for a line frequency of 15,750 cycles per second; or to the fundamental frequency of 15,750 cycles per second.

the drive for the tape may comprise any suitable drive for translating the tape 11 first in the direction of the arrow 16 while one channel on the tape is being scanned and then for translating the tape in the opposite direction as an adjacent channel on the tape is scanned in the opposite direction and so forth. The head 10 is preferably shifted laterally, as indicated by arrow 19, between the scanning of the successive channels at successive reversals of the direction of drive of the tape 11 so that only a single head assembly is required. The tape drive preferably includes an automatic reversal system having switches actuated by means near the opposite ends of the tape 11 to initiate a reversal cycle. The actual reversal preferably automatically takes place during a vertical blanking interval so that it is not visible in the reproduced picture. The changeover is preferably controlled by the vertical synchronizing signal recorded on the tape. The reproduced vertical sync signal which causes tape reversal would be the one following actuation of the tape sensing switch. Each tape sensing switch may be actuated by electrical contact material adhered to the tape near one of the opposite ends thereof. An electronic gate circuit could be opened by a flip-flop circuit if placed in a "set" condition in response to actuation of one of the end of tape sensing switches; the gate would then transmit the next reproduced vertical sync pulse to effect tape drive reversal. Instead of electrical contact material on the tape to signal the approach of an end of the tape, a special changeover signal may be recorded on the tape which when reproduced will be transmitted to the electronic flip-flop circuit to set the flip-flop.

In a simple version the recorder can be reversed and moved to the next channel by manual control such as a pushbutton, in which case it is convenient to have a warning indicator to alert the operator of impending changeover. This can be a neon lamp voltage divider. Resistors Rx and Ry (FIG. 15) are adjusted to give a voltage such as 75 volts which will not ignite the neon lamp but which will keep it on once ignited. When the tape conductive tab shorts out Rx the lamp has 150 volts (or more) across it, igniting it easily. The operator then has a minute for example, to choose an opportune time for changeover. The light is extinguished whenever the changeover button is operated.

Suitable channel width erase heads may be provided at each side of the transducer head 10 and may be energized alternately in accordance with the direction of tape movement so as to insure an erased channel prior to recording regardless of the direction of tape movement. Such channel type erase heads would have a width of about twenty-three mils for the example given. An additional demagnetizing head of width to erase the entire tape could be provided for reducing the noise level between tracks. In the example given such an erase head would have a width of at least about 250 mils.

Figure 7:
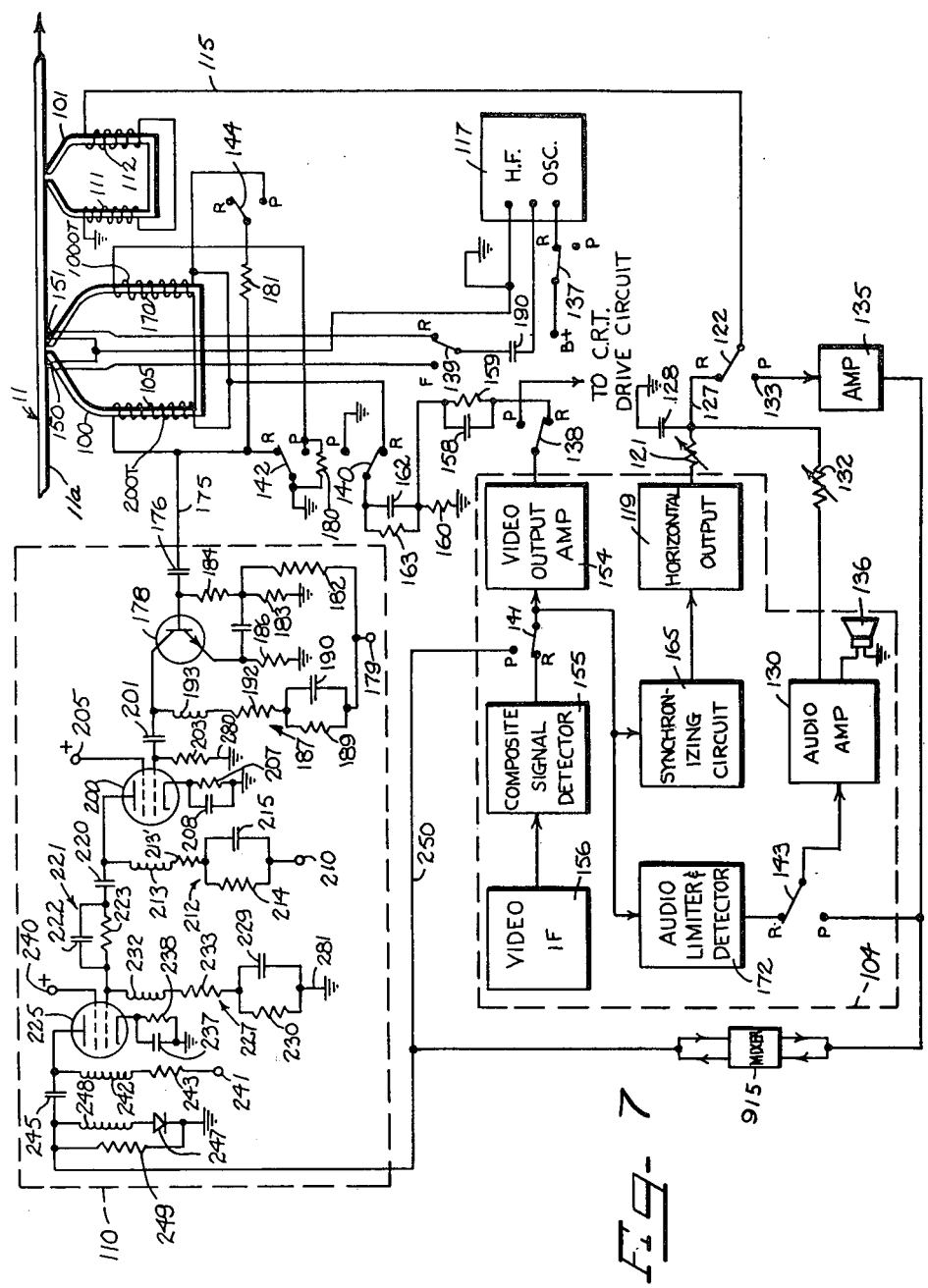
FIG. 7 is a circuit diagram illustrating an audio-video recording and playback circuit for the electromagnetic transducer head of FIG. 1.

FIG. 7 is a circuit diagram illustrating an audio-video recording and playback circuit for use in conjunction with the transducer head 10 of FIG. 1. As shown in FIG. 7, the record medium 11 is moved across the transducer head, which is represented by the video magnetic core 100 and the audio magnetic core 101, to induce audio or video intelligence in appropriate signal coils during the playback operation, or to have the magnetic particles on the record medium 11 magnetized in response to magnetic fields produced by the signal coils during recording operation. A commercially available television set 104 is used to supply a video signal to coil 105. Also provided by the television set 104 is the audio signal which is applied to coils 111 and 112 of the audio magnetic core 101 through the line 115. The coils 111 and 112 are series aiding to provide the audio recorded pattern on the audio tracks shown in FIG. 4. Providing the high frequency biasing signal to the magnetic core 100 is a high frequency oscillator 117. The oscillator 117 may have a fundamental frequency in the range between 3 and 15 megacycles per second, and preferably has an output whose fundamental and harmonic components will not interfere with the operation of the television set 104.

As illustrated in FIG. 7, the high frequency bias for the audio signal is generated by the horizontal output circuit 119 of the television set 104. The high voltage saw tooth waveform of the television horizontal sweep generator transformer of circuit 119 is applied to audio coils 111 and 112 through resistor 121, selector switch 122 and line 115. The sawtooth waveform of the television sweep output circuit 119 has a frequency of 15,750 cycles per second, which is well above the usable audio frequency range of the commercially available television set 104. The resistor 121 provides for an adjustment of bias amplitude to the optimum level in accordance with known principles and also in conjunction with capacitor 128 shapes the bias waveform closer to a sine wave. The capacitor 128 in conjunction with the inductance of the audio coils 111 and 112 provides a tuned circuit which is preferably resonant at a harmonic of the sweep frequency, for example at the third harmonic or 47.25 kilocycles per second. As an alternative, the circuit comprising capacitor 128 and windings 111 and 112 may be tuned to the fundamental frequency which under present standards is 15,750 cycles per second. As a further alternative, a series of pulses may be applied to the windings 111 and 112 of a constant amplitude and of a relatively high frequency substantially above the audio range to provide the bias signal. In any event a high frequency bias signal may be superimposed on the audio signal from the amplifier stage 130 of television set 104. The output of the audio amplifier stage 130 is connected to the coils 111 and 112 through variable resistor 132, switch 122 and line 115. During the playback operation of the recording system, switch 122 is actuated and makes contact with the contact 133, thereby providing an audio playback signal through an auxiliary audio amplifier 135 to the audio circuit of the television receiver 104 including speaker 136.

For purposes of illustration, the selector switches 122, 137, 138, 140, 141, 142, 143 and 144 are shown in the record position and may either be separately actuated or preferably ganged together for simultaneous actuation. The high frequency bias conductors 150 and 151 are selectively connected to the high frequency oscillator 117 by means of forward and reverse switch 139. The high frequency bias signal is removed from the video transducer head core 100 during playback operation by means of switch 137.

The video intelligence applied to the video winding 105 of core 100 is obtained from a video output amplifier 154 of receiver 104 which in turn has its input connected to a composite signal detector 155. The signal received by the television set is amplified by a video intermediate frequency amplifier stage 156 in the television receiver 104. The video output from amplifier 154 is applied to a basic correcting network comprising capacitor 158 and resistor 159 and through a resistor 160. The voltage developed across resistor 160 is applied to a correcting network comprising capacitor 162 and resistor 163. After the video intelligence has passed through the correcting networks, it is applied to coil 105 through switch 140 to produce a video frequency magnetic field in the path of the record medium 11.

The synchronizing circuit 165 located inside the television receiver 104 will provide the necessary horizontal synchronizing signals for the horizontal output stage 119.

The video output amplifier 154 transmits the vertical and horizontal synchronizing signals which are received from the composite signal detector 155 so that the synchronizing signals are recorded on the video track by the video core 100. In this manner the television receiver 104 can then again be synchronized during playback to obtain a steady video reproduction on the television receiver 104.

During the playback operation of the audiovideo recording system, all the selector switches are placed in the playback position indicated by the letter P in FIG. 7. This action will remove the high frequency bias from conductors 150 and 151. Also during the playback operation the video amplifier 154 is disconnected from coil 105, and coil 170 is connected in series with the coil 105. Coil 170 is resonant at a lower frequency than coil 105.

As the record medium 11 moves over the transducer head during playback the audio signal received from the record medium is transmitted by coils 111 and 112 to the standard audio amplifier 135 and then to the audio amplifier stage 130 of the television receiver 104. However, the video portion of the playback signal in coils 105 and 170 is coupled to the amplifier 110 whose output is in turn connected to video output amplifier 154 and synchronizing circuit 165 of the television set 104.

A resistor 180 may be connected in series with winding 170 of the video core 100 to prevent undesired resonance effects during recording. For convenience the resistor 180 may actually be connected across windings 105 and 170 in series. A resistor 181 may be connected across winding 105 of the video core 100 by means of switch 144 during playback to prevent undesired resonance effects of the winding 105.

The audio intermediate frequency amplifier and discriminator component 172 serves to supply an audio frequency input to amplifier 130 during recording, but is not utilized for playback in the illustrated embodiment.

The video playback amplifier 110, shown in FIG. 7, illustrates a circuit for use in cooperation with the transducer head represented by cores 100 and 101. In this circuit, video intelligence from the coils 105 and 170 in series is applied through a line 175 and capacitor 176 to the base electrode of transistor 178, which is the first stage of the wide band video amplifier 110. A low B+ voltage is connected to a terminal 179 and a portion thereof is applied to the base electrode of transistor 178 through the voltage divider network comprising resistors 182, 183 and 184. The low B+ voltage from terminal 179 is also applied to the collector electrode of a transistor 178 through equalizing circuit 187, which comprises a parallel network consisting of a resistor 189 and a capacitor 190 connected to a series circuit consisting of a resistor 192 and an inductor 193. The output of transistor 178 is then applied to the grid electrode of tetrode tube 200 through capacitor 201. A resistor 203 is connected between the grid electrode of tube 200 and ground. The screen grid of tetrode 200 has applied thereto a substantially higher voltage through a terminal 205; however, the voltage applied to the screen grid is preferably lower than the plate voltage of tetrode 200. A biasing network comprising a resistor 207 and a capacitor 208 in parallel is connected in the cathode circuit to tetrode 200. The high voltage for the plate electrode of tetrode 200 is obtained from terminal 210. The terminal 210 is connected to tube 200 through an equalizing circuit 212 consisting of an inductor 213, a series resistor 213' and a parallel resistor 214 and capacitor 215.

The output from the second stage of amplification is then applied through capacitor 220 and through network 221 which comprises a capacitor 222 and resistor 223, to the grid electrode of tetrode 225. The grid electrode of tetrode 225 has connected thereto an equalizing circuit 227, which comprises a parallel combination of capacitor 229 and resistor 230 and a series combination of inductor 232 and resistor 233. A biasing network which comprises a parallel combination of capacitor 237 and resistor 238 is connected between the cathode of tetrode 225 and ground. Connected to the screen electrode of tetrode 225 is a reduced B+ voltage through terminal 240. The B+ voltage applied to the plate electrode of tetrode 225 is obtained from terminal 241 which connects with tetrode 225 through inductor 242 and resistor 243 in series.

The output from the third and final stage of amplification of the video amplifier 110 is applied through capacitor 245 and to a diode 247 and inductor 248 in series and to a resistor 249 shunting the diode and inductor. The output from this shunt arrangement is coupled to the video input of the television receiver 104 by line 250 and switch 141.

Although the first stage of amplification of the video amplifier 110 is shown herein as a transistorized circuit, it will be understood that a vacuum tube amplifier can be used equally well. In the embodiment of FIG. 7, the first stage transistorized amplifier has component values as follows:

| Component | Component Values |
|---|---|
| Capacitor 176 | .15 microfarads |
| Capacitor 201 | .05 microfarads |
| Capacitor 190 | .02 microfarads |
| Resistor 184 | 10k ohms |
| Resistor 183 | 10k ohms |
| Resistor 182 | 150k ohms |
| Inductor 193 | 250 microhenries |
| Resistor 192 | 3.3k ohms |
| Resistor 189 | 18k ohms |
| Resistor 186 | 1000 ohms |

FIG. 8 illustrates a particularly low cost tape transport system for the video recorder of the present invention. In the illustrated embodiment, the record medium 11 travels from a supply reel 301 to a take-up reel 302. The tape path between the reels is past tape guides 304 and 305, past the transducer head 10, between a capstan 307 and pinch roller 308 and past tape guides 309 and 310. The supply spindle 320 is preferably driven by an induction motor 321, the mechanical coupling between the motor and the spindle 320 being indicated at 322. Similarly an induction motor 324 is preferably coupled to the take-up spindle 325 by means diagrammatically indicated at 326. A reversible motor 330 preferably has the capstan 307 and capstan flywheel 331 directly on its shaft indicated at 333.

Brake means are indicated at $B_1$ and $B_2$ for supplying a braking force to the supply and take-up spindles 320 and 325. The brake shoes such as diagrammatically indicated at $B_1$ and $B_2$ may act on brake disks secured to the shafts 320 and 325, for example. A brake for capstan motor 330 is indicated at $B_3$, and preferably the brake $B_3$ is automatically applied, for example by means of a compression spring when the capstan motor is deenergized, the brake being automatically released, for example by means of solenoid 340 upon energization of the capstan motor in either direction of operation.

The system is operated in the forward direction by placing the double pole, double throw reversing switch means 342 in its left hand forward position as viewed in FIG. 8 and by closing the forward switch 343. Under these conditions, the capstan motor 330 is energized to drive the capstan 307 in a counterclockwise direction of rotation so as to move the record medium 11 at constant speed from the supply reel 301 to the take-up reel 302. The take-up motor 324 is energized to drive the reel 302 in the counterclockwise direction so as to wind the tape 11 on the reel 302 as it is delivered thereto from the capstan 307. The supply motor 321 receives a unidirectional current from alternating current supply lines L1 and L2 through rectifier 345 and resistor 346. The direct current energization of the motor 321 is in such a direction as to provide a drag tending to resist rotation of the supply reel 301 in the counterclockwise direction.

In the illustrated embodiment, when a stop button is depressed, the stop switch 340 and forward switch 343 are opened, brakes B1, B2 and B3 are applied, and the pinch roll 308 is shifted in the direction of arrow 348 to disengage the tape 11 from the capstan 307.

When a reverse button is actuated, switches 340 and 350 may be closed, and reversing switch 342 placed in the right hand position. At the same time, brakes B1, B2 and B3 are released and the pinch roll 308 is actuated to engage the tape 11 with the capstan 307. The supply motor 321 is now energized with alternating current through reversing switch 350 to drive the reel 301 in the clockwise direction, while the capstan 307 is also driven by motor 330 in the clockwise direction so as to feed the tape 11 at uniform speed past the transducer head 10. The motor 324 is energized with direct current under the control of rectifier 345 and resistor 346 so as to resist rotation of the take-up reel 302 in the clockwise direction.

It has been found that tape motion is actually steadier when the tape is driven in such a direction that the capstan 307 precedes the head 10, as compared to the normal arrangement where the capstan pulls the tape past the transducer head. It is found that a half wave silicon rectifier such as indicated at 345 furnishing 150 to 300 milliamperes gives a smooth drag even without filtering and without any overheating of the motor. Filtering can be added, if desired, however.

In the pushbutton operation described, only one operating button can be pressed at a time, and must be reset by the stop button before a further button can be depressed. The stop button engages brakes B1, B2, B3 and releases the pinch roll 308. The head is shifted to the next channel each time the motion of the tape 11 is reversed. Thus in the illustrated system, the head is indexed to channel 2 at the completion of the forward motion of the tape, to channel 3 at the end of reverse motion of the tape and so forth. After the tenth channel has been played, the tape 11 is fully wound on the supply reel 301, and the head 10 may be returned to its initial position for engagement with channel No. 1 of a succeeding tape. The resistor 346 serves to provide an adjustment for the tension of the tape between the reel from which the tape is being unwound and the capstan. The guides 304, 305, 309 and 310 may have grooves therein with a dimension substantially corresponding to the width of the tape 11, i.e. ¼ inch, so as to determine accurately the position of the tape for each position of the head 13. As illustrated in FIG. 2, the head assembly 10 may have a tape contacting surface of sufficient width so that the tape 11 is supported in each of the 10 positions of the head corresponding to scanning of the 10 channels on the tape 11. A channel indicator may be coupled with the transducer head 13 so as to indicate the channel being scanned by the transducer head.

The tape recording system of the present invention has a preferred video recording and playback circuit which is shown in the FIG. 10. The circuit of FIG. 10 is primarily concerned with the video intelligence and synchronizing signals and therefore the audio portion of the transducer head is not shown. The audio portion of the system and the details of the video head may be considered as substantially the same as for the corresponding parts of the system shown in FIGS. 1–7.

As shown in FIG. 10, the magnetic record medium 11 is moved across the transducer head, which is represented by the video magnetic core 400 and which has mounted thereon a pair of video coils 401 and 402. The record and playback circuit of FIG. 10 is utilized with a commercially available television receiver indicated at 404.

Referring to FIG. 10, record-playback selector switches 405, 406 and 407 are shown in the playback position so as to connect the coils 401 and 402 in the series. With the switches 405–407 in the playback position, the coil 401 is shunted by a resistor 410, while the coil 402 is shunted by a resistor 411. Resistors 410 and 411 are connected across the coils 401 and 402 respectively to suppress undesirable "ringing" or resonance oscillations which may occur in the coils during the playback operation. When the switches 405–407 are placed in the record position, the coil 402 has a resistor 412 connected thereacross by switch 407 through line 414 and 415, and only the coil 401 is energized through the line 414 from the television receiver of 404. Alternatively, coil 402 may be short circuited during recording.

A video amplifier tube 416 of the television receiver 404 has the output signals thereof connected to the record terminal of a selector switch 418 through a capacitor 419. The signal from the tube 416 is applied to a parallel network comprising capacitor 420 and resistor 421 through a line 422 during the record operation of the system.

A high frequency bias signal is applied to the primary winding 425a of a transformer 425 from a high frequency oscillator 426. A capacitor 423 is connected across the primary winding 425a. The oscillator 426 is energized when a selector switch 427 is placed in the record position, to supply the necessary direct current operating voltage to the high frequency oscillator 426. The secondary 425b of transformer 426 is connected to a cross field conductor 429 of head 400 which preferably is arranged as shown in FIG. 6. Also during the record operation of the tape recording system, a switch contact 428 is connected to a line 430 in the television receiver 404 to supply the usual composite video signal to the tube 416 from the broadcast receiving circuits of receiver 404.

To facilitate construction of the tape recording system of the present invention, as adaptor box 433 is provided for connection to the television receiver 404 preferably as a plug-in unit although the components within box 433 may alternatively be individually wired into the circuit of set 404. Plug-in connections are diagrammatically indicated at 435–439.

During the playback operation of the system, all the selector switches 405–407, 418, 427 and 428 are placed in the playback position indicated by the letter P in FIG. 10. This action will remove the high frequency bias from the transformer 425 and will also prevent the television receiver 404 from receiving any intelligence signal other than that from the record medium 11.

As the record medium 11 moves over the transducer head 400 during a playback, the video and synchronizing intelligence from the coils 401 and 402 is applied through a line 441 and a capacitor 442 to a base electrode of the transistor 443, which is the first stage of amplification of the wide band amplifier shown in FIG. 10. A low direct current supply voltage is developed at circuit points 445 by means of a voltage divider 469, 471 in conjunction with a filter capacitor 472. This voltage is applied to the base electrode of the transistor 443 from a voltage divider network comprising resistors 448 and 449 via a resistor 450. The low supply voltage at circuit point 445 is also applied to the collector electrode of the transistor 443 through a compensating circuit 452 which comprises a parallel network consisting of a resistor 454 and a capacitor 455 connected in series with a resistor 457 and an inductor 458.

A biasing resistor 460 and a feedback capacitor 461 are connected to the emitter electrode of the transistor 443 to provide the necessary operating bias. The output of transistor 443 is then applied to the grid electrode of a pentode tube 464 through a capacitor 465 and an inductor 466.

A grid return resistor 468 is connected between the grid electrode of the tube 464 and ground. The screen grid of the pentode 464 is supplied with positive voltage by virtue of the connection of a resistor 473 between the screen grid circuit and power supply terminal 475'. The pentode 464 is biased by a cathode resistor 474. A capacitor 475 shunting resistor 474 is shown in dotted outline since it may be omitted from the circuit with some reduction in gain, or a small value of capacitance (about 0.001 microfarads) may be used for high frequency emphasis while accepting reduced gain at lower frequencies. A direct current supply voltage for the tube and transistor circuits is obtained from a terminal 475'. The terminal 475' is connected to the plate electrode of tube 464 through a compensating circuit 476 consisting of an inductor 478, a series resistor 479 and a parallel network including a resistor 481 and a capacitor 482.

The output of the second stage of amplification is then applied through a parallel network consisting of an inductor 483 and a resistor 484 and therefrom through a capacitor 485 to the control grid electrode of a pentode 487. The parallel network consisting of inductor 483 and resistor 484 comprise a compensating or correcting circuit. Connected between the control electrode of pentode 487 and ground is a grid return resistor 488. In the cathode circuit of pentode tube 487 is a variable biasing resistor 490 which serves as a gain control for the output of the amplifier circuit shown in FIG. 10. Shunting the variable resistor 490 is a capacitor 491, which may be omitted entirely with some reduction of gain, or a small capacitance may be used for high frequency emphasis. The screen grid electrode of pentode 487 is also connected to the resistor 469. A capacitor 492 is connected between the screen grid electrodes of pentodes 464 and 487 and ground for bypassing the screen grid electrodes. The supply voltage is applied to the plate electrode of pentode 487 through a compensating circuit 493 comprising an inductor 494, a series resistor 495 and a parallel network consisting of a capacitor 496 and a resistor 497. Both the pentodes 464 and 487 have their suppressor grid electrodes connected directly to their respective cathode electrodes as shown in FIG. 10.

The output from the third and final stage of amplification of the amplifier shown in FIG. 10 is applied to the television receiver 404 through a capacitor 498, an inductor L2 (not shown) and a conductor 500a of cable 500. Connected between capacitor 498 and inductor L2 is a clamping network 502 including a series diode 503 connected to a parallel circuit including a resistor 505 and a capacitor 506, and a diode 507 connected in series to a resistor 508 which, in turn, is connected to a winding 510 on the flyback transformer 511 of television receiver 404.

To minimize the effects of stray signals in the amplifier circuit, the chassis of the television receiver 404 is connected to the chassis of the amplifier circuit through a conductor 500b of the cable 500. The amplified signal from the last stage of amplification is applied to the control grid of tube 416 of the television set 404 through a parallel network consisting of a resistor 515 and an inductor 516 when switch 428 is in the playback position.

In the preferred embodiment of amplifier circuit described hereinabove, the component values are as follows:

| COMPONENTS | | COMPONENT VALUE |
|---|---|---|
| Capacitor | 442 | 0.15 microfarad |
| " | 461 | 50 microfarads |
| " | 455 | .01 microfarad |
| " | 465 | .01 microfarad |
| " | 475 | .001 microfarad |
| " | 485 | .005 microfarad |
| " | 492 | 10 microfarads |
| " | 491 | .001 microfarad |
| " | 498 | .002 microfarad |
| " | 496 | .05 microfarad |
| " | 506 | .05 microfarad |
| " | 419 | 1 microfarad |
| " | 420 | 85 micromicrofarads |
| " | 472 | 50 microfarads |
| Resistor | 412 | 22,000 ohms |
| " | 410 | 3,300 ohms |
| " | 411 | 33 K ohms |
| " | 421 | 22 K ohms |
| " | 450 | 10 K ohms |
| " | 449 | 10 K ohms |
| " | 448 | 150 K ohms |
| " | 460 | 1 K ohm |
| " | 457 | 200 ohms |
| " | 454 | 18 K ohms |
| Resistor | 468 | 150 K ohms |
| " | 474 | 68 ohms |
| " | 469 | 47 K ohms |
| " | 471 | 65 K ohms |
| " | 479 | 5,200 ohms |
| " | 488 | 150 K ohms |
| Variable Resistor | 490 | 50 to 250 ohms |
| Resistor | 495 | 1.5 K ohms |

-continued

| COMPONENTS | | COMPONENT VALUE |
|---|---|---|
| " | 497 | 10 K ohms |
| " | 508 | 10 K ohms |
| " | 505 | 470 K ohms |
| " | 515 | 10 K ohms |
| Inductor | 458 | 100 microhenries |
| " | 466 | 250 microhenries |
| " | 478 | 100 microhenries |
| " | 483 | 250 microhenries |
| " | 494 | 100 microhenries |
| " | L2 | 250 microhenries |
| " | 516 | 250 microhenries |
| Transistor | 443 | Type 2 N 708 |
| Tube | 464 | Pentode 6 GM6 |
| Tube | 487 | Pentode 6 GM6 |
| Diode | 503 | 1N34A |
| Diode | 507 | 1N34A |

B+(Voltage applied at terminal 475') equals about 250 volts d.c.

Figure 11:
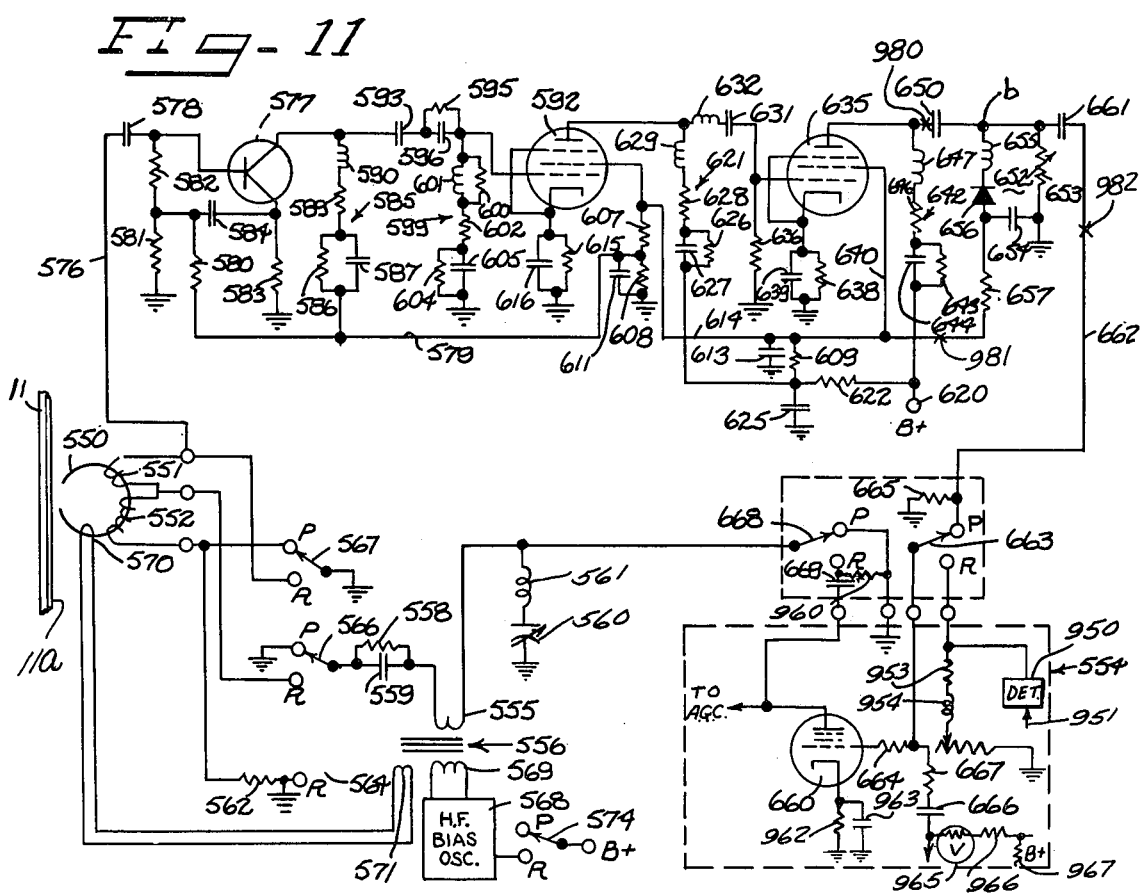
FIG. 11 is a schematic wiring diagram showing an alternate embodiment for use in place of the circuit of FIG. 10.

An alternate embodiment of recording and playback circuitry is shown in FIG. 11. FIG. 11 is primarily concerned with transducing video intelligence and synchronizing signals and therefore the audio portion of the transducer head is not shown. The audio portion of the system and details of the video head may be considered as substantially the same as the arrangement shown in FIGS. 1–7.

As shown in FIG. 11, the magnetic record medium 11 is moved across a transducer head, which is represented by a video magnetic core 550 having mounted thereon a coil 551 and a coil 552. During recording a commercially available television receiver 554 is used to supply video intelligence and synchronizing signals to the coils 551 and 552. The signal from television receiver 554 is applied to the head via a line 553 a secondary winding 555 of a transformer 556, and a parallel network consisting of resistor 558 and capacitor 559. A variable capacitor 560 and an inductor 561 in series are connected between line 553 and ground. A resistor 562 is connected between the lower terminal of coil 552 and ground. Record playback selector switches 566 and 567 are connected to coils 551 and 552 for selecting different operating conditions during recording and playback.

A high frequency bias oscillator 568 has the output thereof applied to the primary winding 569 of the transformer 556. A portion of the high frequency energy applied to transformer 556 is coupled to a biasing coil 570 on the video magnetic core 550 from a secondary winding 571 on the transformer 556. Operating voltage is applied to the high frequency bias oscillator 568 through a record playback selector switch 574. The coil 570 is preferably arranged as indicated in FIG. 5A at 35 or in FIG. 6 at 57.

In the playback mode of the circuit shown in FIG. 11, video intelligence and synchronizing signals from the coils 551 and 552 are applied through a line 576 and capacitor 578 to the base electrode of a transistor 577, which is the first stage of a wide band video amplifier. A low direct current supply voltage is applied to a line 579 and a portion of the supply voltage is applied to the base electrode of the transistor 577 through a network comprising resistors 580, 581 and 582. The low supply voltage from line 579 is also applied to the collector electrode of transistor 577 through a compensating circuit 585 which comprises a parallel network consisting of a resistor 586 and a capacitor 587 and a series circuit consisting of a resistor 589 and an inductor 590.

The output of transistor 577 is applied to the control grid of a pentode tube 592 by means of a coupling capacitor 593 and a compensating network consisting of a resistor 595 and a capacitor 596 in parallel and a circuit 599 which comprises an inductor 601, a resistor 602, and a resistor 604 and a capacitor 605 in parallel. The screen grid of tube 592 is connected to resistors 607 and 608 and to a resistor 609. A capacitor 611 is connected across the resistor 608 to ground potential for removing any unwanted high frequency components from the line 579, while a capacitor 613 is connected between a line 614 and ground potential for bypassing the screen grid of tube 592. A biasing network comprising a resistor 615 and a capacitor 616 in parallel is connected to the cathode circuit of tube 592. The pentode tube 592 has the screen suppressor grid thereof connected directly to the cathode electrode as shown in FIG. 11.

A direct current supply voltage is applied to a terminal point 620 and therefrom to a compensating circuit 621 through a resistor 622. Connected to a point intermediate the compensating circuit 621 and resistor 622 is a capacitor 625 for shunting alternating current signals to ground which might otherwise be impressed on the supply voltage source. Compensating circuit 621 comprises a parallel network consisting of a resistor 626 and a capacitor 627 which is connected to a series network consisting of a resistor 628 and an inductor 629.

The output from the second stage of amplification is then applied through a coupling capacitor 631 and an inductor 632 to the control electrode of a pentode 635. Connected between the coupling capacitor 631 and ground potential is a resistor 636. Connected to the cathode circuit of tube 635 is a biasing network consisting of a resistor 638 and a bypass capacitor 639. The substantially reduced direct current potential on line 614 is applied to the screen grid to tube 635 through a line 640, while the suppressor grid of tube 635 is connected directly to the cathode electrode as shown in FIG. 11.

The output from the third and final state of amplification of the video amplifier shown in FIG. 11 is applied to a compensating circuit 642 comprising a parallel network consisting of a resistor 643 and a capacitor 644 and a series network consisting of a resistor 646 and an inductor 647. The output signal from tube 635 which has been developed across the compensating network 642 is propagated through a coupling capacitor 650 to a clamping circuit 652, which clamps the amplified video signal at a predetermined level for optimum operation of the television receiver 554. The clamping circuit 652 comprises a resistor 653, a capacitor 654, an inductor 655 and a diode 656. The substantially reduced supply voltage from line 614 is applied to the clamping circuit 652 through a resistor 657. The output signal from clamping circuit 652 is applied to the control grid of a video amplifier 660 of the television receiver 554 via a coupling capacitor 661, a line 662, selector switch 663 and a control grid resistor 644. Also connected to the resistor 664 is a capacitor 666 and a resistor 667. The resistor 653 may be a variable resistor to provide a suitable video gain control. However, if automatic video gain control is desired, the automatic gain control voltage from the television receiver 554 can be applied to the grid of tube 635 through resistor 636.

As is shown in FIG. 11, when the tape recording system is in the record position a selector switch 668 is connected to the plate electrode of tube 660 through a coupling capacitor 669, thereby applying video and synchronizing signals to the winding 551 through the transformer secondary winding 555. Also applied to the winding 551 is a high frequency bias signal from secondary winding 555 which cooperates with the high frequency biasing signal from transformer coil 571 in producing an effective bias field.

In the alternate embodiment of the amplifier circuit shown in FIG. 11 as described hereinabove, the component values are preferably as follows:

| COMPONENT | | COMPONENT VALUE | |
|---|---|---|---|
| Capacitor | 559 | 85 | micromicrofarads |
| " | 578 | 0.15 | microfarads |
| " | 584 | 50 | " |
| " | 587 | .02 | " |
| " | 593 | .047 | " |
| " | 596 | 50 | micromicrofarads |
| " | 605 | .003 | microfarads |
| " | 616 | 100 | " |
| " | 611 | 50 | microfarads |
| " | 627 | .05 | microfarads |
| " | 631 | .01 | " |
| " | 613 | 10 | " |
| Capacitor | 639 | 100 | microfarads |
| " | 625 | 8 | " |
| " | 650 | .05 | " |
| " | 644 | 0.1 | " |
| " | 654 | 50 | " |
| " | 661 | .25 | " |
| " | 669 | 4 | " |
| " | 560 | 5 micromicrofarads–80 micromicrofarads | |
| Resistor | 562 | 24 K ohms | |
| " | 581 | 10 K ohms | |
| " | 582 | 10 K ohms | |
| " | 580 | 150 K ohms | |
| " | 583 | 1 K ohms | |
| " | 586 | 18 K ohms | |
| " | 589 | 3.3 K ohms | |
| " | 595 | 12 K ohms | |
| " | 602 | 270 ohms | |
| " | 604 | 47 K ohms | |
| " | 615 | 68 ohms | |
| " | 607 | 47 K ohms | |
| " | 608 | 65 K ohms | |
| " | 609 | 22 K ohms | |
| " | 628 | 4.7 K ohms | |
| " | 636 | 150 K ohms | |
| " | 638 | 60 ohms | |
| " | 600 | 4.7 K ohms | |
| " | 626 | 7.5 K ohms | |
| " | 622 | 1 K ohm | |
| " | 646 | 3 K ohms | |
| " | 643 | 5 K ohms | |
| " | 657 | 300 K ohms | |
| Resistor | 653 | 0–150 K ohms | |
| " | 558 | 22 K ohms | |
| " | 665 | 470 K ohms | |
| Inductor | 590 | 250 microhenries | |
| " | 601 | 250 microhenries | |
| " | 629 | 250 microhenries | |
| " | 632 | 500 microhenries | |
| " | 647 | 100 microhenries | |
| " | 655 | 250 microhenries | |
| " | 561 | 250 microhenries | |
| Transistor 577 | | 2N708 | |
| Tube 592 | | Pentode 6GM6 or 6CB6 | |
| Tube 635 | | Pentode 6GM6 | |

Figure 12:
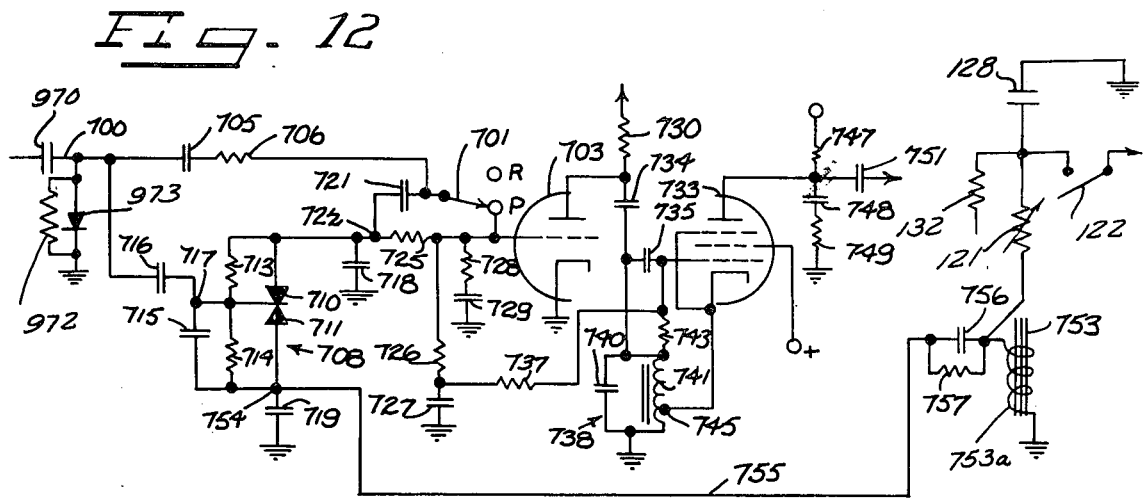
FIG. 12 is a schematic wiring diagram of a preferred horizontal sweep control circuit for a television receiver to be used for recording and playback of video signals in conjunction with the system of the present invention.

For optimum operation of the television receiver used with the tape recording system of the present invention, a synchronizing signal of sufficient amplitude and of proper phase is necessary to provide a uniform horizontal sweep signal for the deflection system. By way of example, and not by way of limitation, FIG. 12 shows a preferred modification of the horizontal control circuit of a Zenith television receiver Model No. 14L30 for the purposes of the present invention. Horizontal synchronizing pulses from a sync-pulse separator of the television receiver are applied to a line 700. These sync-pulses may have an amplitude of 50 volts negative. A record-playback selector switch 701 has one stationary contact thereof connected to the control grid of a triode tube section 703. The triode tube section 703 forms a part of the horizontal sweep oscillator circuit used in the television receiver. During playback operation, the negative horizontal synchronizing pulses on line 700 are applied to the control grid of tube section 703 through a capacitor 705, a resistor 706 and the selector switch 701 as indicated in FIG. 12. However, when the movable contactor of selector switch 701 is in the record position, the horizontal control circuit of FIG. 12 operates under relatively normal conditions to synchronize the horizontal sweep oscillator of the television receiver by means of broadcast signals received from a television transmitting station.

During playback operation of the system, the negative synchronizing signal from the sync-separator is also applied to a phase detector 708, comprising a pair of end-to-end diodes 710 and 711, a pair of resistors 713 and 714, and a capacitor 715. An input capacitor 716 is connected between the line 700 and a terminal point 717, and capacitors 718 and 719 are connected between the anodes of the respective diodes 710 and 711 and ground potential.

The diodes 710 and 711 are preferably of a configuration used by certain manufacturers of television receivers, that is, two diodes in a single container having their cathodes connected together and a lead connected intermediate the cathodes to provide a single encapsulated unit having three leads extending therefrom. The symbol used in FIG. 12 represents such a three terminal unit. However, it can be seen that two individual diodes can be used in the horizontal control circuit of FIG. 12 by connecting their cathodes together and to terminal point 717.

To increase the speed of response of the horizontal control circuit, a capacitor 721 is connected in the circuit and has one end thereof connected to the switch 701 and the other end thereof connected to the output of the phase detector 708 at a terminal point 722. The capacitor 721 is shunted by a resistor 725 through the selector switch 701, while one end of resistor 725 is connected to ground through a first series network consisting of a resistor 726 and a capacitor 727 and through a second series network consisting of a resistor 728 and a capacitor 729. The tube section 703 has the cathode electrode thereof connected to ground potential while the plate electrode thereof is connected to a direct current supply potential through a plate load resistor 730.

The output of tube section 703 is applied to the control grid of a pentode tube section 733 through a pair of capacitors 734 and 735. The tube section 733 forms the other part of the horizontal sweep oscillator of FIG. 12. A portion of the direct current bias developed on the grid of the pentode 733 is fed back to a terminal point intermediate resistor 726 and capacitor 727 through a resistor 737. From a point intermediate capacitors 734 and 735 the output signal of tube 703 is also applied to a tuned circuit 738 consisting of a capacitor 740 and an inductor 741. The tuned circuit 738 is also connected to the grid electrode of pentode 733 through a resistor 743. The cathode of pentode 733 is connected to ground potential through a portion of inductor 741, which is defined by a tap 745, thereby providing the necessary feedback to the tuned circuit to sustain oscillation thereof. The screen grid electrode of pentode 733 is connected to a positive voltage which is somewhat less than the positive voltage applied to the plate electrode of the same tube. The plate electrode of the oscillator tube section 733 is connected to a voltage source, one having a potential of about 600 volts DC, through a plate load resistor 747. A wave form shaping circuit consisting of the resistor 747, a capacitor 748 and a resistor 749 forms a sawtooth wave for driving the horizontal output tube to which the circuit is coupled by means of capacitor 751.

Indicated at 753 is a portion of a flyback transformer incorporated in the horizontal deflection system of the television receiver: Highly positive pulses of approximately 300 volts are generated at winding 753a of the flyback transformer 753. Winding 753a is connected to a terminal point 754 of the phase detector 708 through a line 755 and a parallel network consisting of a capacitor 756 and a resistor 757.

The operation of the horizontal control circuit of FIG. 12 when the selector switch 701 is in the record position is virtually unchanged from that which the manufacturer had intended for receiving television signals which have been transmitted by a television transmitting station. However, when the selector switch 701 is in the playback position, as shown in FIG. 12, the speed of response of the horizontal control circuit is greatly increased to enable compensation for any high speed flutter in the motion of the record medium. The positive 300 volt pulses from flyback transformer 753 represents the horizontal oscillator sweep frequency and this is compared by the phase detector 708 with a synchronizing pulse applied to the phase detector from line 700. If the horizontal sweep oscillator of FIG. 12 tends to run too fast, the phase comparison circuit 708 causes the control grid of tube segment 703 to become more positive which, in turn, increases the effectiveness of capacitor 734, which is shunted across the oscillator tuning capacitor 740 through the plate to cathode circuit of tube segment 703. The increased tuning capacity tends to decrease the oscillator frequency in a corrective manner to the synchronizing frequency of the horizontal synchronizing pulses applied to line 700.

To provide proper compensation for flutter in the tape recording system, the capacitor 721 and resistor 728 are incorporated. These components enable the grid electrode of tube segment 703 to sense the effect of phase errors between the 300 volt pulses from the flyback transformer 753 and the 50 volt negative pulses from the sync-separator circuit almost immediately. To further increase the speed of response to phase errors, it is preferable that the capacitor 705 and resistor 706 be connected between the line 700 and the grid electrode of tube segment 703 for superimposing a direct trigger pulse through the horizontal control tube 703 and therefrom to the grid electrode of horizontal oscillator tube section 733. A change in phase of the pulse from phase detector 708 will immediately affect the discharge point of the horizontal oscillator to give a higher speed correction of flutter in the tape recording system. For optimum stability of horizontal control circuit in FIG. 12 the ratio $R1/R2$ should preferably equal the ratio $C2/C1$, where $R_1$ and $R_2$ refer to the resistance values of resistors 706 and 728 and C1 and C2 refer to the capacitance values of capacitors 705 and 729.

The horizontal control circuit of FIG. 12 has great economy since only two resistors and two capacitors are required to modify the original horizontal control circuit of the television receiver. The added resistors are resistor 706 and resistor 728, while the added capacitors are capacitor 705 and capacitor 729. In some instances, it may be desirable to reduce the values of capacitors 718 and 719 to further increase the speed of response of the horizontal control circuit.

In the horizontal control circuit of FIG. 12 the component values are preferably as follows:

| COMPONENTS | COMPONENT VALUES |
|---|---|
| Capacitor 705 | 100 micromicrofarads |
| Capacitor 715 | 51 micromicrofarads |
| Capacitor 716 | 51 micromicrofarads |
| Capacitor 718 | 390 micromicrofarads |
| Capacitor 719 | 390 micromicrofarads |
| Capacitor 721 | 200 micromicrofarads |
| Capacitor 727 | .047 microfarads |
| Capacitor 729 | 470 micromicrofarads |
| Capacitor 734 | 1000 micromicrofarads |
| Capacitor 735 | 470 micromicrofarads |
| Capacitor 740 | 3300 micromicrofarads |
| Capacitor 748 | .005 microfarads |
| Capacitor 751 | .005 microfarads |
| Capacitor 756 | 4.7 micromicrofarads |
| Resistor 713 | 330 K ohms |
| Resistor 714 | 330 K ohms |
| Resistor 706 | 750 K ohms |
| Resistor 725 | 1 megohm |
| Resistor 726 | 150 K ohms |
| Resistor 728 | 150 K ohms |
| Resistor 743 | 100 K ohms |
| Resistor 730 | 68 K ohms |
| Resistor 737 | 10 megohms |
| Resistor 747 | 120 K ohms |
| Resistor 749 | 12 K ohms |
| Resistor 757 | 150 K ohms |
| Tube segments 703 and 733 | Type 6 KD8 |

Still another method of reducing the effects of flutter in the tape recording system of the present invention is shown in FIG. 13. Here a compensating signal is applied to the beam deflection circuit of the television receiver for correcting the beam deflection signal. Negative horizontal synchronizing pulses are applied to the horizontal deflection circuit of FIG. 13 through a line 800 and therefrom to a balanced phase detector 801 through a capacitor 802. The balanced phase detector 801 consists of a pair of end-to-end diodes 805 and 806, a pair of resistors 807 and 808 shunting the diodes 805 and 806 respectively, a capacitor 809, and a pair of capacitors 811 and 812 connected between the anodes of the respective diodes 805 and 806 and ground potential.

The output of phase detector 801 is applied to the control grid of a tube 815 through a variable resistor 816. Connected to one end of variable resistor 816 is a resistor 817 which is connected to a negative bias supply. The variable resistor 816 and resistor 817 form a voltage divider network which provides the necessary width control of the horizontal sweep signal from tube 815. A filter capacitor 819 is connected between a point intermediate the variable resistor 816 and fixed resistor 817, and ground potential thereby preventing high frequency signals from appearing across the negative bias supply. The cathode and suppressor grid of tube 815 are connected to ground, as shown in FIG. 13, while the screen grid electrode of tube 815 is connected to a positive voltage which is of some potential less than the supply potential applied to the plate of the same tube.

The horizontal sweep signal from the output of tube 815 is applied to a primary winding 821 of an output transformer 822. Connected between the primary winding 821 and supply terminal 824 is a filter capacitor 825 for preventing high frequency signals from appearing across the supply. A secondary winding 827 of the transformer 822 has one end thereof connected to a capacitor 828 while the other end of winding 827 is connected to a high voltage positive supply through terminal 829. Also connected to the terminal point 829 is one end of a flyback transformer 831 and one lead of a capacitor 832, while the other lead of capacitor 832 is connected to capacitor 828 and to the horizontal deflection yoke 835. Connected between a tap 836, of the deflection yoke 835, and one end of the deflection yoke 835 is a capacitor 837. The capacitor 837 and the horizontal deflection yoke 835 are connected to a tap 839 on the flyback transformer 831 through a line 840.

The upper lead of the horizontal flyback transformer 831 is connected to a high voltage rectifier, not shown, the output of which supplies the necessary high voltage for the picture tube of the television receiver. A lead 843 from the flyback transformer 831 is connected to the damper circuit of the television receiver, while a lead 844 of the flyback transformer 831 is connected to the horizontal output circuit of the television receiver.

The signal to be compared with the horizontal synchronizing pulses applied to line 800 is derived from a winding 846 on the flyback transformer 831 and positive pulses therefrom, corresponding to the horizontal oscillator frequency, are applied to the phase comparator circuit 801 through a line 847 and a parallel network 848 consisting of a capacitor 849 and a resistor 850. As the phase comparator 801 senses a difference in phase relationship between the two horizontal rate signals applied thereto, the charge on capacitor 811 will vary thereby changing the bias applied to the grid electrode of tube 815 which, in turn, will vary the amplitude of the compensating signal applied to the output transformer 822.

Although the flutter compensation circuit shown in FIG. 13 is more complex than that shown in FIG. 12, it can be used in television receivers in which flutter compensation such as provided by capacitor 721 in FIG. 12 is impractical. The flutter compensating circuit shown in FIG. 13 is preferably used in addition to a usual horizontal control circuit, or in addition to a modified horizontal control circuit such as illustrated in FIG. 12. Where the control circuit of FIG. 12 is also utilized, the critical resistance and capacitance values for the components of FIG. 13 may be chosen to complement the deficiencies of the other control circuit. For example the circuit of FIG. 13 can respond to the higher range of flutter frequencies above the range that is controlled by the control circuit of FIG. 12. By way of example in the embodiment of FIG. 13, capacitor 832 may have a value of 0.15 microfarads while capacitor 828 may be a 5,000 microfarad low voltage electrolytic capacitor.

The curves 675 and 676 in FIG. 9 illustrate the relative phase of the signals obtained for example from the coils 402 and 401, respectively, of the magnetic core 400, FIG. 10, as a function of frequency. The same relationship preferably applies to the playback heads of the other embodiments. Curve 680 shows the desired characteristics of the playback amplifier for providing a zero phase difference at the output of the head - amplifier system over the frequency range of interest. The curve 675 may represent the response of a winding such as 402 having 1000 turns where the curve 676 represents the phase relationship for a winding such as 401 having 200 turns.

In FIG. 9A, curve 683 represents the output from a coil such as 402 as a function of frequency while curve 684 represents the output amplitude from a coil such as 401 as a function of frequency, of course assuming a constant amplitude input to the head 400. The dash line 685 indicates in a general way the total response of the windings 401 and 402 together in the frequency range between the resonant frequency of coil 402 indicated by the vertical mark 686 and the resonant frequency of the coil 401 indicated by the vertical mark 687. It will be observed that the output amplitude is substantially higher than would be the case with the coil 402 alone.

As indicated by comparison of FIGS. 9 and 9A, the phase reversals of curves 675 and 676 occur at the respective resonance frequencies of the coils (where the amplitude of the signals induced in the coils is at a maximum). The region 678 of the curve 675 corresponds to the resonant frequency of the coil 402, for example, while the region 679 of curve 676 corresponds to the resonant frequency of the coil 401.

In the compensating circuit 452 at the output of transistor 443, FIG. 10, for example, the inductor 458 in conjunction with capacitor 455 is especially selected to provide a phase reversal in curve 680 at the resonance frequency of winding 402 as indicated at 682. The relative values of resistor 457, capacitor 455 and inductor 458 are critical for proper amplitude and phase correction. The resistor 457 and capacitor 455 may be provided with a trimmer adjustment means so as to adjust the frequency and amplitude characteristics at region 682 of curve 680. Also, the inductor 458 may be provided with a trimmer adjustment so as to be adjustable to a precise value giving the optimum changeover frequency in coincidence with the phase shift obtained by the coil 402.

It may be noted, that means for compensating for the phase reversal obtained from the coils such as 401 and 402 may be provided in any one or more of the amplifier stages in the playback amplifier. As shown in FIG. 7, the second amplification stage of tube 200 has a resistor 213' and a capacitor 215 which control the position of the changeover region 682 of the curve 680, while the inductance value of the inductor 213 in the second amplification stage also affects the position of the region 682 of the curve 680 in FIG. 9. The location of region 681 of the curve 680 is affected by the parallel network consisting of capacitor 222 and resistor 223 in the input circuit of the third and final amplification stage of the playback amplifier shown in FIG. 7 and also by the values of inductors 193, 213, 232 and 242. Either or both of the compensating network 187 and the compensating network 227, FIG. 7, may be provided with trimmer adjustments as mentioned hereinabove in connection with FIG. 10.

To illustrate another means for compensating for phase reversal of signals from the transducer head, the capacitor 596 and resistor 595 in conjunction with inductor 601 and resistor 600, in the input circuit of tube 592, FIG. 11, will control the location of the region 681 of the curve 680.

Shown in FIG. 14 is means for automatically positioning the transducer head 10 in alignment with successive channels on a record medium. The transducer head may include a casing generally designated by reference numeral 850 secured to a threaded body member 852; or the transducer head casing 850 and the threaded body member 852 can be constructed in a single unit. A threaded adjusting screw 855 is threaded through the body member 852 and rotatably mounted through a chassis member indicated at 856. At the upper end of the adjusting screw 855 is a knurled knob 857, which is provided for manually positioning the transducer head in alignment with the first or any desired channel on a record medium.

To prevent undesirable rotational movement of the transducer head while the adjusting screw 855 is rotating, a tang 859 is provided on the body member 852 and in slidable engagement with a slot 861 located in a stationary member 862 of the tape recorder. However, other means for preventing rotational movement of the transducer head during rotation of the adjusting screw 855 may be provided.

Secured at the lower end of the adjusting screw 855 is a ratchet wheel 865 which is engageably aligned with a locking pawl 866. The locking pawl 866 is pivotedly secured to the chassis member 856 by a pin 868. As shown in FIG. 14B, the locking pawl 866 can move about the pin 868 in the directions indicated by double headed arrow 869 between a position engaging a stop 869a and a position engaging a stop 869b.

A driveshaft 870 of a spring operated drive motor 871 extends through the chassis 856 and is secured to a shaft portion 872 of adjusting screw 855. Mounted on the shaft 870 is a gear 873 which engages gear teeth 875a of an indicator assembly 875 which is rotatable on a shaft 874. As the transducer head is positioned at a given tape channel by the drive motor 871, the gear 873 rotates the geared indicator 875. The gear ratio between gear 873 and the indicator 875 is such that the indicator will rotate about 36° during the movement of transducer head 850 between each successive channel on the record medium. The tape channel indicator 875 is preferably provided with a disk portion 875b having numerals to indicate the tape channel position of the transducer head, as shown in FIG. 14A. An indicating pointer 876 is used to indicate the numberal of the indicator 875 which is to be read. To place the transducer head in alignment with tape channel number 1, the knurled knob 857 is rotated clockwise to rotate the geared indicator 875 counter-clockwise until the first tape channel is indicated by the pointer 876. This action winds the spring of motor 871. When the transducer head is being positioned manually by rotation of knob 857 in the clockwise direction the ratchet 865 is rotated clockwise as seen in FIG. 14B so that the arcuate portions 865a are turned toward the pawl fingers 866a and 866b and come in slidable contact therewith. When the rotation of the knurled knob 857 is discontinued, the spring motor 871 will rotate the ratchet 865 in the opposite direction a slight amount until one of the radial faces 865b of the ratchet teeth becomes engaged with the pawl finger 866b on the pawl 866. This action will lock the ratchet wheel 865 against the pawl 866 and prevent the adjusting screw 855 from turning further in the counterclockwise direction and will accurately position the transducer head.

By way of example, when the transducer head is in the first tape channel position, and the record medium may be moving in the forward direction with the pawl finger 866b abutted against one of the ratchet tooth radial faces 865b which one face may be specifically designated 865c. When the record medium reaches a point near its end of travel, a signal is generated to call for a reversal in the direction of travel of the record medium. Actuation of the tape drive control to reverse mode may momentarily shift pawl 866 in the counterclockwise direction against the action of a tension spring 877. In so doing, the member 866b is brought out of locking engagement with the one face 865c of the ratchet 865 while another face 865d is engaged by pawl finger 866a as spring motor 871 drives the wheel 865 in the counterclockwise direction. Release of pawl 866 allows spring 877 to return the pawl to a position against stop 869b as spring motor 871 completes the rotation of the wheel 865 to the position where pawl finger 866b engages radial face 865e.

The ratchet 865 and pawl 866 are constructed so that each oscillation of the pawl 866 as just described allows a predetermined rotation of the ratchet wheel 865 corresponding to movement of the transducer head between successive channels. As the transducer head reaches the second channel position, for example, the radial face 865e of wheel 865 will engage the pawl member 866b to stop further rotation of the adjusting screw 850 by the spring motor 871. As the record medium reaches a point near the end of travel in the reverse direction a signal is again generated calling for a change in the direction of travel of the record medium. The pawl 866 once again is momentarily moved to its position against 869a and then released, advancing the transducer head to the next successive tape channel position. This action will continue until all channels of the record medium have been scanned.

The transducer head 10 is preferably provided with a plurality of grooves 878 which are separated by lands 879. The number of grooves 878 on either side of the magnetic recording area 880 is preferably equal to one less than the number of channels provided on the record medium. The center-to-center distance between adjacent grooves 878 may be 0.025 inch in the case of ten channels on a ¼ inch wide tape. In this manner, the width of the groove 878 may be equal to the width of the recorded track on the record medium 11, FIG. 1, while the width of the lands 879 may be equal to the width separating adjacent tracks of the record medium. Therefore, as the record medium moves across the transducer head, one track of the record medium will be passing exactly over the magnetic recording area 880 defined by poles 30 and 43 of the core 13 and poles 20 and 21 of the core 14, FIGS. 3 and 5, while the remaining tracks of the record medium will be passing exactly over the grooves 878, thereby reducing the amount of wear of the record medium in the area of the recorded intelligence. By way of example, and not by way of limitation, the preferred embodiment of the above invention incorporates a transducer head wherein the grooves 878 are 0.019 inch across, while the lands 879 are 0.006 inch across.

FIG. 15 illustrates diagrammatically a warning indicator circuit for indicating the approach of the end of the tape. A guide member with a tape engaging face 885 of metal is incorporated in the transport mechanism shown in FIG. 8 and may correspond to one of the tape guides 304, 305, 309 or 310. Flush with the guide member surface 885 are electrical contactors 886, 887 and 888. The forward and reverse selector switch 890 has one stationary contact thereof connected to the electrical contact 888 through a line 891, while the other stationary contact of selector switch 890 is connected to the electrical contact 886 through a line 892. The electrical contact 887 is connected to ground potential through a line 893. Actually the entire surface 885 is preferably grounded. The contacts 886 and 888 may be insulated from surface 885 as indicated at 889a and 889b. The contact 887 may be an integral part of surface 885.

One end of a record medium indicated at 895 has a metallic contact 896, which when passing over the guide 885 will bridge the electrical contacts 887 and 888 thereby indicating the approach of one end of the record medium and provide a signal to call for reversal of the direction of travel of the record medium and positioning of the transducer head 10, FIG. 14, for cooperation with the next succeeding tape channel. The opposite end of the record medium indicated at 897 has a metallic contact 898 which when passing over the surface 885 will bridge the contacts 886 and 887, thereby providing a signal calling for a further reversal in the direction of movement of the record medium.

A direct current supply voltage is applied to a terminal 900 and therefrom to a neon lamp 901 through a resistor which has a value of resistance Ry and is designated by the reference numeral 903. A resistor 905 having a value of resistance Rx is connected in series with the neon lamp 901 and the resistor 903 across the potential source connected to terminal 900. The values Ry and Rx of resistors 903 and 905 may each be one megohm, for example. Shunting the neon lamp 901 is a resistor 902 which provides for current flow through resistors 903 and 905 prior to the time when resistor 905 is short circuited by one of the contacts 896 or 898 on the tape. The resistance value of resistor 902 may be such in comparison with values Rx and Ry that the voltage drop across resistor 902 is insufficient to initiate conduction in neon lamp 901, but will maintain conduction in lamp 901 once initiated by the tape contact 896 or 898. Switch 907 is momentarily actuated each time a forward button 908 or a reverse button 909 is depressed to change the direction of movement of the tape and/or each time a stop button 910 is actuated. The momentary closure of switch 907 removes the holding voltage across lamp 901 and thus renders the lamp nonconducting. Contact 890 is shifted to its righthand position indicated by the letter R in response to actuation of reverse button 909 to cause the tape to be moved in the direction of arrow 16.

Thus in a manual system, the operator may depress stop button 910 when the lighting of lamp 901 indicates the approach of an end of the tape. The tape movement is thereafter reversed by depressing the appropriate button 908 or 909 to unlatch the stop button and thus close contact 340, to close switch 343 or 350, respectively, and to place switch 342 in forward or reverse position, respectively. By way of example actuation of stop button 910 may close contact 907 against the action of a compression spring 910 and unlatching of the stop buttom 910 may allow contact 907 to open.

Referring to the circuit of FIG. 7, while as previously described the values of inductor 213, resistor 213' and capacitor 215 may control the position of the changeover region 682 of the curve 680 shown in FIG. 9, in a circuit in accordance with FIG. 7 which was actually constructed, the values of inductor 232, resistor 233 and capacitor 229 were the critical values for determining the frequency at which the changeover region 682 of curve 680 occurred. In the embodiment of FIG. 7 as in the other embodiments, all of the switches necessary to place the system in condition for recording or playback mode may be coupled for simultaneous actuation in response to manual operation of a single record-playback lever or knob or may be under the control of respective manually operated play and record buttons of the momentary type or of the latched type (where operation of one button unlatches the other button). In the record mode, the broadcast television receiver 104 is preferably in condition for receiving and displaying a broadcast television signal whether or not a magnetic recording operation is also actually taking place.

Referring to FIG. 7, a mixer component 915 is provided which is arranged to couple energy from the audio circuit to the video circuit, from the video circuit to the audio circuit, or to couple energy in both of those directions simultaneously. The mixer component 915 may also include suitable phase adjustment means and amplitude adjustment means in each direction of coupling so as to serve to counteract any stray coupling from the audio circuits of the transducer head into the video amplifier 110 and/or to counteract any coupling from the video portion of the magnetic head into the audio circuits.

Referring to FIG. 8, the reference numeral 920 illustrates an erase head which may be selectively energized with high frequency erasing current to erase all ten channels of the record medium simultaneously, for example in advance of the recording on a first channel of the record medium as the tape is wound from the supply reel 301 to the take-up reel 302. A guide pin may be provided as indicated at 921 so that the tape 11 does not touch the pressure roller 308 after the tape leaves contact with the capstan 307. A dampling pad is preferably located as indicated at 922 in FIG. 8 in sliding contact with the tape between the capstan 307 and the head 10. The damping pad 922 may be of felt or other absorbent material for damping out high frequency vibrations in the length of tape between the capstan 307 and the head 10. Such vibrations are harmful in video picture reproduction. The damping pad 922 may be in sliding contact with the magnetizable surface of the tape 11 as illustrated in FIG. 8 or may be in engagement with the non-magnetic backing material of the tape. The pad 922 may be impregnated with molybdenum disulfide and/or graphite.

It has also been found advantageous to impregnate the pressure pad 15 shown in FIG. 1 with molybdenum disulfide and/or graphite.

The capstan motor 330 may operate at a speed of the order of 3600 revolutions per minute and may have the flywheel 331 directly on the motor shaft which shaft is integral with the rotor of the capstan motor. The capstan roller 307 may be immediately adjacent the surface of the flywheel 331 at the side of the flywheel remote from the capstan motor 330.

In an actual embodiment the capstan brake B3 was mechanically linked to the push buttons for actuation to released condition upon depressing of button 908 or 909 and to braking position upon depressing of push button 910.

A single winding such as provided by conductor 35 supplies both the A and B components of the cross field, referring to FIG. 5A of the present application. Further, with the head of the present invention a hum bucking construction may be used during playback. The core 13 shown in FIG. 1 may be formed of two identical core halves abutting at the gap spacer 23 and at the junction indicated at 190, for example, for economical tooling. The head of the present invention provides effective high frequency bias in the multi-megacycle range which is especially important for video recording. The head of the present invention can be made to operate in both directions of tape travel preferably with selection of the X-field winding 150 or 151 by means of switch 139; however a conductor such as 35 at only one side of the gap may be used to supply bias for recording in either direction of movement of the record medium across the gap. Using a conductor such as 150 at the trailing side of the gap as the tape travels in the reverse direction still has an advantage over a conventional head since a higher bias frequency can be effectively used with a conductor such as 35 or 150 near the tape path than with a conventional bias winding.

The embodiment of FIG. 6 hereof is specifically disclosed as incorporating the audio magnetic circuit 14 of FIG. 1 and the other components of the embodiment of FIGS. 1–5. As previously described, the use of very high frequency bias in the megacycle range gives lower noise in the recording of audio frequency signals and other signals.

It will be understood that an important concept of the present invention resides in that frequency components may be supplied to the winding 105 during recording which are above the resonant frequency of the head coil 170 taken with its self-capacitance and any parallel circuit capacitance. Also during playback, the coils 105 and 170 supply frequency components above the resonant frequency of coil 170 to the amplifier 110 which is responsive to such frequency components and transmits the same to the cathode ray tube of the receiver 104 for effective reproduction. By way of example, frequency components may be effectively recorded which are at least 3 times the resonant frequency of the winding 170 and may, for example, effectively record components having a frequency of 5 or more times the resonant frequency of the coil 170. Similarly, during playback, the coils 105 and 170 may respond to frequency components equal to at least three times the resonant frequency of the coil 170 and including frequency components equal to five times the resonant frequency of the coil 170, for example.

During recording frequency components above the resonance frequency of head coil 170 could be supplied to head coils 105 and 170 connected as for playback in FIG. 7, that is in series with coil 105 producing a magnetic field opposing that of coil 170 at frequencies below the resonance frequency of coil 170; but the use of a coil having only a few turns and a high resonance frequency such as coil 105 alone is preferred during recordoperation of the head.

Where the winding 170 has the relatively large number of turns, the winding 105 will provide the relatively greater voltage during playback at the higher frequencies, while the winding 170 will predominate at the lower frequencies. The resonance frequencies of the two windings may be such that the windings are effectively connected in series bucking relation with respect to low frequencies. A shunt path may be provided in the magnetic circuit for the small winding by-passing the larger winding. If the windings 105 and 170 are made with equal turns they may be connected in parallel during recording and in series during playback. Or one may be used for recording, and both in series for playback. Magnetic keepers of magnetically soft material may be provided in contact with the adjacent inactive channels on each side of the gap 23 so as to reduce cross talk.

With respect to the audio magnetic core arrangement illustrated in FIGS. 1–3, will be observed that the audio fields recorded on the record medium as indicated in FIG. 4 while producing aiding output voltages in the audio coils 17 and 18 tend to cancel each other with respect to the video coils 27 and 28.

To summarize by way of example suitable parameters for the illustrated embodiments, the tape 11 may have a magnetizable layer indicated at 11a in FIG. 3 with a thickness of 3 to 12 microns or 0.12 to 0.5 mil. The tape coercive force may be approximately 275 oersteds and the remanence $B_R$ may be approximately 1000 gauss. The tape may move at constant speed in the range between 60 and 120 inches per second. The pressure pad 15 may be of a smooth felt and may be urged against the inactive surface of the tape 11 by means of a spring arm 15a with a light pressure. The gap 23 may have a dimension in the direction of tape movement of 50 micro inches and the core 13 may be formed of ½ mil permalloy laminations having a width of 1/16 inch and stacked 1/64 inch high. The core may provide a magnetic circuit of approximately square configuration having a dimension of 7/16 inch on each side. The winding 27 may have 1000 turns of No. 44 A.W.G. wire and the winding 28 may have 200 turns of No. 40 A.W.G. wire. The inductance of the 200 turn coil may be approximately 1 millihenry while the inductance of the one thousand turn coil may be approximately 25 millihenries. The bias field conductors 35 and 45 may comprise No. 34 (A.W.G.) wire polished at the top surface as indicated at 35a in FIG. 5A and disposed at a distance from the gap 23 of 4 mils. A bias frequency between 2 and 15 megacycles per second may be utilized and the current supplied to the conductor 35 or 45 may be in the range from ½ ampere to 2 amperes. The signal current supplied to the winding 28 may be in the range of 1 to 4 milliamperes measured peak to peak of the current waveform. The embodiment of FIG. 6 may be entirely similar in utilizing No. 34 wire flattened as indicated at 35a in FIG. 5A and with the surfaces such as indicated at 35a in sliding engagement with the active undersurface of the magnetizable layer of the tape 11. For the case of two conductors as indicated at 57a and 57b in FIG. 6 with a center to center distance from the gap 23 of 6 mils and 14 mils, respectively, the current supplied to the conductor 57 may be in the range of from four to ten amperes measured peak to peak of the current waveform. The frequency is again between 2 and 15 megacycles per second. Of course, it will be understood that the cross field conductors such as 35, 45 and 57 may be of ribbon configuration, or may have multiple turns so long as the proper relationship is established between the cross field component indicated at A in FIG. 5A and the gap field component indicated at B. Generally for recording of video frequencies such as television signals the gap 23 may have a dimension in the direction of tape movement in the range between about 30 and 90 microinches. The audio core section 14 may be formed from permalloy laminations 0.014 inches thick and 1/16 inch wide (the width dimension being in the horizontal direction for the vertical legs associated with windings 17 and 18 in FIG. 3, for example). The laminations forming the video core may also be 1/16 inch wide, referring to the horizontal dimension of the vertical legs associated with coils 27 and 28 as viewed in FIG. 1, for example. The windings 17 and 18 may each have 1500 turns of No. 46 (A.W.G.) wire.

By way of example, the housing parts 47', 48 and 49 indicated in FIG. 2 may be of non-magnetic metal such as bronze or non-magnetic stainless steel. The conductors such as 35, FIG. 5A, may be secured in the grooves such as 39 by means of a layer 417 of epoxy resin, for example. The imbedding material 417 may be undercut at each side of the conductor 35 so that only the surfaces 30a and 35a are exposed for sliding contact with the undersurface of the magnetizable layer 11a of the tape 11.

It is considered preferable to polish the surfaces such as indicated at 30a, 35a and 43a in FIG. 5A with a heating current supplied to the conductor 35 or to the conductor 57 in FIG. 6 or with the head otherwise heated to its operating temperature.

Referring to FIG. 10, the primary winding 425a of transformer 425 is preferably part of the tank circuit of the oscillator 426. The primary winding 425a and the capacitor 423 are tuned to resonate at the frequency of operation of the oscillator 426 and are brought close to the head core 400 so that the secondary circuit including secondary winding 425b and cross field conductor 429 may have substantially the minimum practical impedance. In other words, the leads connecting the secondary winding 425b and the cross field conductor 429 have a minimum length, the long leads being in the primary circuit between the tank circuit and the remainder of the oscillator indicated at 426.

It has been found advantageous, although optional, to connect a capacitor 930 across resistor 411. The capacitor 930 when employed is connected across the winding 402 during playback.

by way of example, capacitor 930 may have a value of 35 micro microfarads.

During recording operation, a resistor 412 is connected across the winding 402. Resistor 412 may have a value of 22,000 ohms, for example.

In FIG. 10 if the head characteristics are controlled closely taking into account the effect of resistors 410 and 411 and capacitor 930, if present, the values of capacitor 455, resistor 457 and inductor 458 may be fixed at appropriate values relative to such head characteristics and trimmer components omitted.

The parallel network of inductor 483 and resistor 484 in the circuit of FIG. 10 are preferably selected to provide a high frequency series peaking circuit.

In the circuit of FIG. 10, during playback operation, the output of the playback amplifier is supplied via a capacitor 666 and a resistor 667 to a conventional automatic gain control circuit 933 which may be that of the Zenith 14L30 Chassis previously referred to. The plate of the automatic gain control section of the automatic gain control and sync.clip tube of said 14L30 Chassis (Type 6HS8) may be connected to lead 935 indicated in FIG. 10 which leads to one contact of a switch 937. A capacitor 938 is connected between line 935 and a line 939 of the circuit. When the switch 937 is in its upper position, the lower end of resistor 488 is grounded, while when the switch 937 is in the lower position, the lower end of the resistor 488 is connected to line 935 to receive gain control signals from the automatic gain control circuit 933 of the television set 404.

The clamping circuit of FIG. 10 has the following features:

1. It provides bias for the video amplifier tube 416 of the television set 404.

2. It allows transients in the signal to pass without substantial rectification. Such rectification would cause picture and sync. distortion.

3. The clamping circuit is non-critical as to shift in clamping interval due to flutter in the signal reproduced from the record medium.

4. The circuit operates stably in conjuction with the flutter stabilizing circuit of FIG. 12.

5. The circuit uses a minimum of inexpensive parts.

6. The circuit does not require additional transformers, amplifier stages, delay lines, trigger circuits or the like.

7. The clamping circuit does not shift the picture portion of the signal appreciably or require a special setting of the horizontal operator hold control (controlling the inductance of inductor 741, FIG. 12) for playback as compared to normal operation of the television set 404.

The circuit point indicated at 942 in FIG. 10 within the television set 404 is connected with a source of 250 volts d.c. voltage through variable resistor 965 (FIG. 11) which may have a value of about 1 to 5 megohms, a 120,000 resistor 966, and a 22,000 ohm resistor 967. A further resistor is indicated at 944 in FIG. 10 in shunt with the branches of the clamping circuit 502. Registor 944 may have a value of 300,000 ohms to provide a net shunting resistance of about 250,000 ohms taking into account the loading of resistor 944 by the components within the television set 404 previously referred to. The value of resistor 944 of 300,000 ohms is selected where capacitor 498 has a value of .003 microfarads, inductor 499 has a value L1 of 6.2 millihenries, resistor 505 has a value of 470,000 ohms, capacitor 506 has a value of 0.047 microfarads, resistor 508 has a value of 22,000 ohms and the pulses from the output transformer 511 via winding 510 have peaks of minus 7 volts occurring at the horizontal line rate.

Components 503, 499 and 506 of the first branch of the clamping circuit 502 may be in series in any sequence. Resistor 505 may be placed across inductor 499 and capacitor 506 instead of across capacitor 506 only. In the second branch of the clamping circuit components 507 and 508 may be interchanged in position in the circuit. Resistor 505 and capacitor 506 may be omited (shorted out) if a bias voltage is not required for the video amplifier stage 416.

The foregoing examples of specific values of the various components of the clamping circuit and of various rearrangements and modifications are, of course, by way of example only and not by way of limitation.

In operation of the circuit of FIG. 10 in the playback mode, the winding 510 of output transformer 511 of the television set 404 supplies a waveform as indicated at 946. The seven volt negative peaks of the waveform occur at the line rate and produce a negative current flow through the series circuit including components 508, 507, 499, 503, and component 505 and 506 in parallel. Circuit point 947 in FIG. 10 becomes negatively charged with respect to ground by approximately 2.5 volts. Circuit point 948 is momentarily driven to about minus 2.75 volts due to the negative current pulse through diode 503. Circuit point 947 remains essentially at minus 2.5 volts at all times, while circuit point 948 drops to minus 2.5 volts after the negative current pulse has terminated. The presence of diode 503 clamps circuit point 948 which is directly coupled to the grid of tube 416 in the television set to 2.5 volts negative at the end of the negative actuating pulse of current produced by the peaks of the waveforms 946. The end of each actuating pulse occurs approximately at the end of the horizontal blanking period, after which a positive going picture signal is transmitted through coupling capacitor 498. The picture signal can change the potential of circuit point 948 in a positive direction up to a potential of zero volts at which diode 507 becomes conducting. Similarly the signal is not restricted if it does not swing below minus 2.5 volts. Thus picture signals up to 2.5 volts peak potential can be accommodated. Each horizontal line of the picture signal starts with respect to a minus 2.5 volt reference potential which is established by the clamping circuit at circuit point 948. The bias or reference potential may be made more negative by increasing resistor 505, by decreasing the value of resistor 508, or increasing the amplitude of the pulse voltage waveform 946; and the bias or reference potential may be made less negative by oppositely changing the aforementioned values. The inductance of inductor 499 offers a high impedance to composite signal transients which are present in the type of video system described (due to high frequency emphasis, phase shifts, etc.) thus minimizing rectification by diode 503. Rectification by diode 503 would otherwise cause distortion and sync. shift. The inductance 499 also reduces clipping of the sync. peak amplitudes when the clamping circuit 502 is actuated at time intervals corresponding to the back porch of the video waveform.

A resistor for example having a value of 5000 ohms may be used in place of inductor 499, but the inductor has been found to give better results. Resistor 508 has an effect for positive peaks of the composite video signal similar to that provided by inductor 499.

The resistor 944 together with the parallel resistance of the television circuit 404 discharges coupling capacitor 498 to some extent during the line scan interval. A time constant of about 750 microseconds for capacitor 498 and its discharge resistance including resistor 944 is a good compromise, (corresponding to the product of 250,000 ohms and 0.003 microfarads), with a range from 200 to 2000 microseconds being practical. The discharge circuit provided by the resistance including resistor 944 reduces low frequency noise, shades the picture and has been found to reduce distortion and sync. shift.

The degree of clamping action may be increased by reducing the value of resistor 508 or by increasing the pulse peaks of waveform 946, the value of resistor 505 being reduced correspondingly to maintain the specified bias.

The proportions set forth in the above example have been found advantageous, since too strong a clamping action may affect the sync. adversely by suppressing the vertical sync. for example.

The clamping circuit of FIG. 10 may be inverted and positive pulses supplied by means of a winding such as 510 if clamping of a negative going picture signal is desired.

The resistor 412 which may have a value of about 22,000 ohms is shown as an alternative to short circuiting the winding 402 which has the relatively large number of turns, during the recording operation.

Referring to FIG. 10, and particularly to the television circuit 404 utilized during recording operation, it will be observed that resistor 664 associated with the grid of tube 416 is connected with certain components of the television circuit only when the selector switch 428 is in the record position. These components associated with line 430 have been indicated as comprising the detector circuit 950 which is a standard part of chassis 14L30 and has its input 951 connected to the third I.F. stage of Chassis 14L30. Line 430 is also connected to component 953, 954 and 955 of Chassis 14L30. In Chassis 14L30, resistor 953 has a value of 1500 ohms and resistor 955 has a maximum value of 2500 ohms. The television set is in condition for normal operation whenever switch 428 is in the record position, whether or not switch 418 is also actuated to record position. A broadcast television signal may be viewed on the television set 404 whenever switch 428 is in the record position, and the received broadcast signal may be simuultaneously recorded on the record medium 11 when switch 418 is in the record position also.

In Chassis 14L30 output line 958 of the video amplifier 416 is connected to the cathode ray tube of the set 404 without further amplification stages.

Referring to FIG. 10, the tank circuit comprising capacitor 423 and transformer 425 may be tuned to the bias frequency which, for example may be 2.75 megacycles per second.

Referring to FIG. 10, resistor 481 may typically have a value between 3,000 ohms and 10,000 ohms. Capacitor 482 may be adjustable between 0.001 microfarads and 0.5 microfarads to correct for various individual heads associated with the circuit of FIG. 10. In other words capacitor 482 may be adjusted to take account of manufacturing tolerances and the like in the manufacture of individual heads as generally illustrated, for example, in FIG. 1, FIG. 6 or FIG. 10 and associated with the circuit of FIG. 10.

With respect to the circuit of FIG. 10 where clamping is to occur at the back porch of the composite video signal, it is desirable to increase the intensity and/or width of the pulses supplied to the clamping circuit 502 from the winding 510 during the vertical sync. intervals, thereby keeping the sync. level of the clamped composite picture signal more nearly constant.

Referring to the circuit of FIG. 11, the movable plate of capacitor 560 is preferably grounded. Capacitor 560 and inductor 561 are tuned to the frequency of the high frequency bias oscillator component 568 to keep the high frequency bias signal out of the circuits of the television set 554. By way of example, capacitor 560 and inductor 561 may be resonant at 2.75 megacycles per second where this is the frequency of oscillator component 568.

A resistor 960 which may, for example, have a value of 500,000 ohms is preferably connected between the record terminal of selector switch 668 and ground.

In the circuit of FIG. 11, resistor 600 may be omitted, depending on the compensation characteristic required.

The resistor 653 in FIG. 11 is used mainly for adjusting the low frequency phase shift (although it does affect the gain of the video circuit).

In one embodiment in accordance with FIG. 11, capacitor 605 had a value of 0.003 microfarads while resistor 602 had a value of 270 ohms, giving a time constant of 0.81 microseconds. This represented the minimum time constant for the various compensating circuits of the specific embodiment. Capacitor 605 may, however, have a value as low as from about 0.001 to 0.002 microfarads.

Various components of the conventional circuit identified as the 14L30 Chassis have been indicated in FIG. 11 including a resistor 962 and capacitor 963 in the cathode circuit of tubes 660, and resistance elements 965, 966 and 967 leading to a source of B+ voltage (supplying a voltage value of 250 volts D.C. Resistor 967 and and B+ source connected therewith are bypassed by a 4 microfarad capacitor (not shown).

Referring to FIG. 12, a capacitor 970, a resistor 972 and a diode 973 are indicated as being connected to the input line 700 of the circuit. This circuit when interposed between the minus 50 volt sync. pulses and the horizontal control circuit attenuates the vertical pulses which otherwise tend to affect the modified control circuit of FIG. 12 during the vertical blanking interval. The original circuit of Chassis 14L30 responds too slowly for the vertical pulses to change its frequency appreciably.

In FIG. 12, components 737, 726 and 727 serve to supply negative bias voltage to the grid of tube section 703, this negative bias being tapped from the negative grid voltage of the oscillator section 733. It will be understood by those skilled in the art that the tube section 703 serves as a reactance tube for controlling the oscillator frequency of the oscillator tube section 733. Section 733 is a Hartley type sine wave oscillator, with coil 741 tapped at 745 and a capacitor 740 forming the frequency determining circuit tuned to approximately 15,750 cycles per second. A movable permeable core in the coil 741 enables trimming of the frequency, this core being moved by the "horizontal hold" knob of the television set. The upper part of coil 741 is coupled to the grid of tube section 733 through capacitor 735, with a grid leak resistor 743, for example of 100,000 ohms, developing the negative bias. Resistor 737 may have a value of 10 megohms, for example. The lower part of the coil 741 which is grounded forms part of the anode or screen portion of the oscillator circuit, with the cathode connected to 745 being at an intermediate potential.

The winding 753a of transformer 753 corresponds to the winding connected to resistor 121 in FIG. 7 for supplying line rate pulses to the audio core section of the head which may correspond to the head of FIGS. 1–3. This has been indicated in FIG. 12. It will be understood that FIG. 12 may be associated with the head of FIGS. 1–3 or FIG. 6 including the audio core section and additionally with the circuit of FIG. 10 or FIG. 11. The winding 753a gives 300 volt positive pulses, but these pulses are integrated by capacitor 719 in conjunction with resistor 757 so that the wave shape at circuit point 754 is a sawtooth. The small capacitor 756 sharpens the sawtooth peak to give more sensitivity.

With respect to the relationship R1/R2 should preferably equal C2/C1 as previously mentioned with respect to FIG. 12, it should be understood that the presence of resistance 726 and capacitor 727 will modify this relationship to some extent.

Where the values of capacitors 718 and 719 have been reduced compared to their values in the 14L 30 Chassis, the decreased values have been found to have a negligible effect on the normal operation of the television receiver when the switch 701 is in the upper record or inactive position.

Although it is most economical to use a modified circuit such as that indicated in FIG. 12 in the television set as indicated, a separate horizontal stabilizing circuit along the lines of that shown in FIG. 12 may be utilized instead. As previously indicated resistor 743 is a grid leak resistor and does not have much coupling effect between coil 741 and the grid of tube section 733.

For maximum pleasure in viewing without using keepers, the head of FIG. 14 would be indexed two or three channels for example about 75 mils at each reversal of tape movement, using a wider tape or using a fewer number of active channels for a given width of tape. Where keepers such as 978 are used, grooves may be provided in the keeper material as indicated in solid outline at 878 in FIG. 6, preferably spaced to clear recorded tracks in all positions of the head as previously described with respect to FIG. 14.

To reduce the interference where closely spaced channels are used, the keepers may be ungrooved to provide a continuous tape-contacting surface completely contacting the recorded areas (both audio and video) of adjacent channels. For example keeper strips on respective sides of the video core 13 may preferably cover the entire tape confronting surface of the head casing and be separated by a distance only 11 mils greater than the active channel width. Thus for an active channel width of 19 mils, the spacing between the keeper strips may be about 30 mils. For example, the audio pole faces such as indicated at 14a and 14b in FIG. 6 which actually contact the tape may have a dimension of about 2 mils to leave a space of about 3.5 mils from the edge of the adjacent keeper. The pole faces 14a and 14b may have dimensions in the direction of tape movement of about 20 mils. The curved ends 980 and 981 of conductors 57 and 57' may be ground off to fit within the 5.5 mil space between the audio gap spacer 20 and the edge of the adjacent keeper strip. Similarly the portions such as 982, 983 and 984 of conductors 57 and 57' may be ground off to fit the 5.5 mil space. The keeper strips may be formed of 2 mil thick "Permalloy". A shield case of similar material may surround the remaining sides of housing parts 47, 48 and 49 and overlap the outer margins of the keeper strips which margins would be clear of the tape path.

By way of example, the head may be indexed only 25 mils at a time where such keeper strips and magnetic shielding of the transducer head are employed.

With the embodiment actually illustrated in FIG. 6, with or without keepers the conductor length 57a may be four mils from gap 23, and may itself have a width of 6 mils. The layer 417 shown in FIG. 5A may add another mil so that the receiving grooves for conductor lengths 57a and 57b may each have a width of 7 mils. The spacing between the grooves for conductors lengths 57a and 57b may be 4 mils, so that the outer or remote edge of the groove receiving conductor length 57b may be 22 mils from gap spacer 23. Audio cores 14a and 14b may be spaced about 1/16 inch from the gap spacer 23 and may have a width of about 15 mils, so that the outer or remote edge of the audio core is about 62 mils from the gap spacer 23. Each half of the video core 13 has a dimension in the direction of tape movement of about 156 mils, in this example. It will be understood that FIG. 6 is not in exact proportion since the audio poles 14a and 14b are actually about twice as wide as conductor 57 and are spaced from conductor 57b by about 3/64 inch (40 mils or about 6 times the width of conductor 57).

In FIGS. 8, 14B and 15, pushbuttons 908, 909 and 910 have been indicated diagrammatically with dash lines indicating a mechanical coupling of the push buttons with switches 340, 343 and 350 in FIG. 8 and with switch 907 in FIG. 15. Similarly in FIG. 15, solid lines 969 and 970 represent a one way coupling between pushbuttons 908 and 909 and switch contact 890. From the position shown in FIG. 15 it may be assumed that if the stop button 910 is depressed, reverse button 909 will be released, but contact 890 will remain in the reverse position shown. Thereafter, when forward pushbutton 908 is depressed, switch contact 890 will be moved by mechanical link 969 to its left hand or forward position. When the stop button 910 is next depressed, forward pushbutton 908 will be unlatched, but the contact 890 will remain in the forward position. Of course, movable switch contact 890 could be replaced by two contacts one coupled with the forward button 908 and the other coupled with the reverse button 909 to establish the same circuit conditions when the respective buttons are depressed.

The lever 866 may be suitably coupled to the pushbuttons so that it is moved from its position against stop 869b to its position against stop 869a and then allowed to return under the impetus of tension spring 877 whenever the drive is changed from the forward to the rewind direction or vice versa, to the next channel by this oscillation of the lever 866. By way of example, if the stop button must always be actuated before reversal of the direction of movement of the record medium, the stop button 910 may be mechanically coupled to the lever 866 as indicated by the dash line 971 in FIG. 14B. Provision may be made to uncouple or lock out the mechanical coupling 971 in in case it is desired to drive back and forth while the head remains in scanning relation to a given channel.

Of course a relay may be utilized in place of the neon lamp circuit of FIG. 15 so as to automatically actuate the stop button 910 and then the other of the forward and reverse buttons so as to automatically reverse the direction of movement of the tape and index the scanning head. Alternatively, automatic reversal during playback may take place in response to cues placed on the record medium during recording for governing the automatic playing of a succession of channels. Where the record medium is in the form of an endless loop, the tape drive need not be reversed, and the head may be indexed between successive channels in the manner disclosed in our U.S. Pat. No. 2,857,164 issued Oct. 21, 1958, the disclosure whereof is incorporated herein by reference.

In an apparatus which has been constructed and successfully operated, which may be termed the demonstration apparatus, the head configuration corresponded to that described with respect to FIG. 1, but utilizing a pair of cross field conductors as indicated at 57 and 57' in FIG. 6. That is, the casing conformed with the one shown in FIGS. 1, 2 and 3 and the audio core arrangement conformed with that shown in FIGS. 1, 2 and 3. The winding 27 comprised 1000 turns of No. 42 A.W.G. wire, while winding 28 consisted of 200 turns of No. 40 A.W.G. wire. The winding 28, however, had a shorter axial extent than the winding 27 and was arranged near the pole piece 974 on the leg 975 so that the center with respect to the axial direction of the winding 28 was closer to the scanning gap 23 than the center of the winding 27. The winding 27 had an inductance of about 27 millihenries and a resonant frequency in the range from 200 to 400 kilocycles per second. The winding 28 had an inductance of about 1.1 millihenries and a resonant frequency of about 2 megacycles per second. The gap spacer 23 had a dimension in the direction of tape movement of about 50 microinches. The video core 13 was formed of ½ mil Permalloy laminations as indicated in FIG. 6. The two pole pieces 974 and 976 together defined a length dimension of the core 13 of about 7/16 inch, while the legs 975 and 977 each had a long dimension of about 7/16 inch.

The cross field conductors 57 and 57' were arranged symmetrically with respect to the gap spacer 23 with the first length portion such as 57a being spaced 4 mils from the gap, and the two length portions such as 57a and 57b having a separation of 4 mils. The conductors were substantially semicircular in cross section and had a diameter corresponding to that of No. 34 A.W.G. wire, or approximately 6 mils. The detailed arrangement of the cross field conductors with respect to the video core is as illustrated in FIG. 5A with epoxy resin imbedding material as indicated at 417 undercut as indicated at 979 in FIG. 5A. The active face of the magnetizable layer 11a of the tape record medium was in sliding contact with the surfaces of the cross field conductors corresponding to surface 35a in FIG. 5A.

The core part indicated at 47 in FIG. 1 was not present in the demonstration apparatus. The video core 13 had a transverse dimension of about 15 mils to provide a 15 mil wide video track such as indicated at 66 in FIG. 4.

The audio core 14 comprised a single lamination about 15 mils thick. The audio gap spacers 20 and 21 were each 2 mils thick and of brass material. The audio windings were 1500 turns each of No. 46 A.W.G. wire. The audio track such as indicated at 64 and 65 were thus approximately 2 mils thick to provide an overall track width of about 19 mils.

The pressure pad indicated at 15 was of smooth felt material and pressed against the inactive surface of the record medium 11 with a light spring pressure.

The tape transport for the demonstration apparatus was as illustrated in FIG. 8 using a damping pad 922 of felt impregnated with graphite and molybdenum disulfide. A pin as indicated at 921 was also utilized as well as the electric circuit shown in FIG. 8 and the brakes B1, B2 and B3.

The audio bias was supplied to the audio windings 17 and 18 as illustrated in FIG. 7 and in FIG. 12 at 121, 122. The audio bias frequency was thus 15,750 cycles per second.

The video bias was supplied as illustrated in FIG. 11 both to the selected cross field conductor 57 or 57' depending on the direction of tape movement and to the video winding 28. In other words, the secondary winding 571 in FIG. 11 was connected to the cross field conductor 57 in FIG. 6 when this conductor was crossed first by the record medium, and the winding 571 was connected to the cross field conductor 57' when the tape moved in the opposite direction and crossed the cross field conductor 57' first.

The current supplied to the active cross field conductor was approximately 2 amps peak to peak at 2.75 megacycles per second as measured by a commercial current probe in conjunction with an oscilloscope. The bias frequency current supplied to the winding 28 during recording had a value of about 20 milliamperes peak to peak at 2.75 megacycles per second as measured by the commercial current probe in conjunction with the oscilloscope. The video current supplied to the winding 28 including the synchronizing pulses had a value of from 1 to 4 milliamperes peak to peak as measured by the current probe in conjunction with the oscilloscope. The frequency spectrum measured by the commercial probe extended from about 20 cycles per second to more than 10 megacycles per second.

The record media used with the demonstration machine were ¼ inch premium grade audio and instrument tapes having a coercive force of about 275 oersteds and a $B_R$ of about 1000 gauss. The tape was moved at a speed of about 120 inches per second.

The electric circuitry utilized during recording and playback corresponded to that illustrated in FIGS. 11 and 12 except that the clamping circuit of FIG. 10 was utilized in place of the clamping circuit of FIG. 11. More specifically, the component of FIG. 11 between points 980, 981 and 982 were omitted, and the clamping circuit arrangement beyond point 984 in FIG. 10 substituted therefore. The components 944, 515, 516 of FIG. 10 as well as the components 510 and 511 from FIG. 10 were also utilized. The automatic gain control line 935 was not, however, utilized in the demonstration apparatus. The recording circuit including components 669, 960, 560 and 561 of FIG. 11 were utilized in the demonstration apparatus instead of the corresponding component of FIG. 10.

In the modified embodiment of the amplifier circuit of FIG. 11 which has been adopted for demonstration purposes, the component values are preferably as follows:

| COMPONENT | | COMPONENT VALUE | |
|---|---|---|---|
| Capacitor | 559 | 85 | micro microfarads |
| Capacitor | 560 | 5–80 | micro microfarads |
| Capacitor | 578 | 0.15 | microfarads |
| Capacitor | 584 | 50 | microfarads |
| Capacitor | 587 | .02 | microfarads |
| Capacitor | 593 | .047 | microfarads |
| Capacitor | 596 | 50 | micro microfarads |
| Capacitor | 605 | .003 | microfarads |
| Capacitor | 616 | 100 | microfarads |
| Capacitor | 611 | 50 | microfarads |
| Capacitor | 627 | .05 | microfarads |
| Capacitor | 631 | .01 | microfarads |
| Capacitor | 613 | 10 | microfarads |
| Capacitor | 639 | 100 | microfarads |
| Capacitor | 625 | 8 | microfarads |
| Capacitor | 644 | .1 | microfarads |
| Capacitor | 669 | 4 | microfarads |
| Resistor | 562 | 24 K ohms | |
| Resistor | 581 | 10 K ohms | |
| Resistor | 582 | 10 K ohms | |
| Resistor | 580 | 150 K ohms | |
| Resistor | 583 | 1 K ohm | |
| Resistor | 586 | 18 K ohms | |
| Resistor | 589 | 3.3 K ohms | |
| Resistor | 595 | 12 K ohms | |
| Resistor | 602 | 270 ohms | |
| Resistor | 604 | 47 K ohms | |
| " | 615 | 68 ohms | |
| " | 607 | 47 K ohms | |
| " | 608 | 65 K ohms | |
| " | 609 | 22 K ohms | |
| " | 628 | 4.7 K ohms | |
| " | 636 | 150 K ohms | |
| " | 638 | 60 ohms | |
| " | 626 | 7.5 K ohms | |
| " | 622 | 1 K ohm | |
| " | 646 | 3 K ohms | |
| " | 643 | 4.7 K ohms | |
| " | 558 | 22 K ohms | |
| Inductor | 590 | 250 microhenries | |
| " | 601 | 250 microhenries | |
| " | 629 | 250 microhenries | |
| " | 632 | 500 microhenries | |
| " | 647 | 100 microhenries | |
| " | 561 | 100 microhenries | |
| Transistor 577 | | 2N708 | |
| Tube 592 | | Pentode 6GM6 or 6CB6A | |

| COMPONENT | COMPONENT VALUE |
|---|---|
| Tube 635 | Pentode 6GM6 or 6CB6A |

(Parts from Figure 10 substituted in place of Parts 650, 654, 661, 653, 657, 656, 655, 665 in Figure 11)

| COMPONENT | COMPONENT VALUE |
|---|---|
| Capacitor 506 | .047 microfarads |
| Capacitor 498 | .003 microfarads |
| Capacitor 656 | .01 microfarads |
| Resistor 508 | 22,000 ohms |
| Resistor 505 | 470,000 ohms |
| Resistor 515 | 4,700 ohms |
| Resistor 667 | 68,000 ohms |
| Resistor 664 | 330 ohms |
| Inductor L1 | 6.2 millihenries |
| Inductor 516 | 250 microhenries |
| Diode 503 | IN34A |
| Diode 507 | IN34A |
| Inductor 12 | omitted |

It will be noted that in the actual demonstration circuit, resistor 600 of FIG. 11 is omitted. The capstan motor in FIG. 8 in the demonstration apparatus operates at the same speed in each direction of rotation. The indexing means illustrated in FIG. 14 is not used in the demonstration apparatus, and the spacing between channels is selected as desired. With a close channel spacing, without the use of keepers as described in connection with FIG. 6, some interference may be observed between the channels, although the video information is accurately reproduced. The interference between channels is, of course, avoided by choosing an adequate spacing between adjacent channels as described in connection with FIG. 6.

The playback frequency response for the demonstration apparatus including the head (but not the tape) was flat from about 16 kilocycles per second to the resonant peak frequency of the head, the response thereafter rising at an increasing rate to the upper useful frequency limit of the system. Thus, the playback frequency response was flat from about 16 kilocycles per second to approximately 300 kilocycles per second, the response thereafter rising at an increasing rate to approximately 2 megacycles per second. The head had irregularities (peaks and valleys) in its response curve due to pickup at points other than the main gap (such as edges of the head core) and the dimensions of the head core were such that these irregularities occurred at frequencies below 15,750 cycles per second. In the demonstration apparatus, the clamp circuit of FIG. 10 operated with a signal polarity such that the sync. pulses were negative. Of course the clamp circuit can be reversed for an opposite polarity signal.

To illustrate the flutter reduction obtained in the demonstration apparatus using the circuit of FIG. 12, the following tabulation may be given indicating generally the results observed.

| Flutter Frequency, Cycles Per Second | Ratio of Reproduced Flutter with Circuit of Figure 12/Flutter with Original Circuit in same TV Set |
|---|---|
| 10 | 0.14 |
| 20 | 0.13 |
| 30 | 0.06 |
| 60 | 0.05 |
| 120 | 0.07 |
| 180 | 0.12 |
| 300 | 0.15 |
| 600 | 0.23 |
| 900 | 0.50 |
| 1200 | 0.75 |
| 3000 | 0.80 |
| 10,000 | 0.80 |

The motor 330 having the capstan 307 on the shaft thereof may be of the hysteresis synchronous type, but where economy is paramount an induction type may be used, in which case the induction motor is preferably operated with an air gap flux density of about 7500 gauss or less, being less than about half the normal operating density of such motors. This has been found to eliminate rotor speed fluctuations at harmonics of the power line frequency, which speed fluctuations were otherwise so severe that a satisfactory picture could not be recorded.

In FIG. 1, the 200 turn winding 28 is physically shorter and is placed higher on the core legs than the 1000 turn winding 27. That is, the top of the winding 28 as viewed in FIG. 1 is above the top of the winding 27 as viewed in FIG. 1.

The capacitor 990 in FIG. 8 is, of course, for the purpose of shifting the phase of the energizing current in one winding of the motor 330 as compared to the phase of the energizing current in the other winding of the motor. Actuation of the switch 342 from one position to the opposite position changes the phase relationship by about 180° to cause rotation of the motor in the opposite direction.

The playback circuit of the demonstration apparatus including the head provides a substantial useful low frequency response down to at least about 800 cycles per second. The response below this relatively low frequency drops off at an increasing rate which reaches a rate higher than 6 decibels per octave. There is a substantial boost in low frequency response in the region between about 800 cycles per second and about 8000 cycles per second. Thus there is a substantial boost in low frequency response at frequencies directly above the low frequency response at frequencies directly above the low frequency cutoff value of about 800 cycles per second.

It will be observed that the time constant for capacitor 721 and resistor 728 in FIG. 12 is about 30 microseconds. The time constant for capacitor 705 and resistor 706 is about 75 microseconds. The time constant for capacitor 719 and resistor 714 is about 130 microseconds, and the time constant for capacitor 718 and resistor 713 is about 130 microseconds also. Capacitor 729 and resistor 728 have a time constant of about 75 microseconds, matching 705 and 706.

In the demonstration apparatus it is considered that the time constant provided by capacitor 721 and resistor 728 is of greatest importance.

It has been found that interference between the high frequency bias and the television picture signal during recording is reduced if the bias oscillator frequency is adjusted to certain exact values where beats are minimized. (For this reason capacitor 423 in FIG. 10 is preferably a variable capacitor.)

With a balanced audio head arrangement as illustrated in FIGS. 1-3 of the present case, the audio balance may be established by shifting the tape laterally and a laterally adjustable tape guide is indicated at 993, 994 in FIG. 2 for this purpose.

In general the time constants of the correction networks in the various embodiments are considered of substantial importance and the illustrated values given herein represent good choices for such time constants.

Compensation is preferably provided in the earliest stage as in FIGS. 10 and 11 to prevent distortion of high level signals by the amplifier. Although the equalizing circuits in FIGS. 10 and 11 resemble video amplifier coupling networks in some respects, the values of resistance, capacitance and inductance chosen for the illustrated circuits as given herein are widely different from conventional video amplifier circuits, and give sharp changes in frequency response over the useful spectrum; in contrast to a relatively flat response which is the objective of ordinary video compensating networks.

The time constants chosen in FIG. 10, 11 and 12, for example, are unique and important for television recording and the like.

In FIG. 7, the peaks of the reproduced signal prior to integration are so high that they are clipped, with consequent distortion.

Bias frequencies from 3 to 15 megacycles per second have been advantageously employed with the configuration of FIG. 6.

It is contemplated that the demonstration apparatus may be successfully operated at a lower speed such as 60 inches per second, for example.

In the circuit of FIG. 10 diode 507 may be shorted out.

A head such as shown in FIG. 1 may have appreciable pickup during playback near the core ends where the tape 11 makes first and last contact with the video core 13. This is minimized by the use of keepers as previously described with reference to FIG. 6, by sloping the head at an angle and lifting the tape out of contact with the core ends, rounding the core ends, etc. If the core dimension from gap to end are made long enough, the effects of this pickup occurs at frequencies below the line frequency, causing minimum interference with the reproduced signal. Thus the core should be long enough so that a recorded wavelength corresponding to 15,750 cycles per second is not picked up appreciably by the core ends compared to the pickup at the main gap. For a tape speed of 120 inches per second this corresponds to a recorded wavelength of 0.0075 inches approximately.

Compensation for flutter may be effected by using the output of a discriminator or frequency comparison circuit as in FIG. 13 or FIG. 12 to control the width of the horizontal scan in the display tube, as by narrowing the width when the playback is too slow, and increasing the width when the signal is too fast. The width may be controlled by modulating the screen voltage of the horizontal output tube, or by modulating the high voltage applied to the display tube, according to the output from the frequency comparison circuit.

In FIG. 11 the circuit point $b$ common to 650 and 661 assumes a positive potential with respect to ground, depending on the potential of 614 and the relative values of 657 and 653. Capacitor 654 also assumes practically the same potential. The composite video and negative going sync. applied to this circuit point $b$ through 650 may swing the circuit point $b$ in the positive direction with minimum loading since this places a reverse voltage across diode 656. However when the signal swings in the negative direction, diode 656 becomes conducting and offers a low impedance to ground through 654. The signal is thus clamped at its negative sync. level.

Rectification of the negative sync. tips lowers the potential of 654 (and of $b$) momentarily, but 654 regains its charge through 657 during the interval between sync. pulses. The discharge rate of point $b$ through 653 is nearly independent of the signal because it is determined mainly by the bias which is added to the signal. The bias may be 5 to 10 times as great as the signal, or even higher. This arrangement gives a clamping action independent of variations in the picture, especially in portions of the cycle where the signal is becoming more positive; and provides uniform shading of the picture. The degree of discharge may be regulated by adjustment of 653. Inductor 655 minimizes clipping the leading edge of the sync. pulses. Coupling network 661, 665 transfers the clamped signal to the TV set without substantial distortion.

The recording circuits are essentially flat to below 10 cycles per second in voltage response, with negligible phase shift to below 60 cycles per second. At low and medium frequencies the picture voltage waveform including normal sync. pulses is transformed faithfully into a current waveform by 558, 421, or 163; into a magnetic flux waveform by head 550, 400 or 100; and recorded as a variation in flux on tape 11.

At the highest frequencies, capacitors 559, 420, 158, and 162 compensate for shunt capacity of the head, impedance rise in its windings, core losses, losses in the recording circuits, etc. to maintain the recording flux wave as a faithful reproduction of the composite signal.

A preferred condition of recording head response is when the voltage across the head winding rises in direct proportion to frequency at frequencies high enough so that head winding resistance is negligible compared with its reactance. When this condition is achieved the current in the heads described in this specification rises with frequency to a certain degree.

The 6GM6 tube is suitable for A.G.C. operation, as its amplification varies with grid bias.

The demonstration apparatus used a hysteresis synchronous type capstan motor.

As an alternative to driving the head from the output of the TV set video amplifier, the amplifier in the recorder could be used for this purpose. For example, during recording the grid of 635 can be connected to the TV set at its video detector or to the cathode circuit of its video amplifier, or to its plate circuit through a step down voltage divider. Line 553 would then be connected to the plate circuit of 635 during recording, instead of to the plate circuit of the TV set video amplifier. This arrangement reduces loading of the TV video amplifier, eliminates some connections, and reduces the impedance level of the signals in the cable.

In addition to the warning signal indicator of FIG. 15, one may record a special signal on the tape at the end of each channel at the time the record is made, to mark the various points of reversal and channel changeover. During playback these signals may automatically actuate the reversal and channel changeover, to give continuous playback without any manipulation on the part of the operator.

The simplest clamping circuit, shown in FIG. 7, comprises 245, 248, 247, 249. This is poled for a picture signal with positive-going sync. pulses.

While the audio pole pieces have been illustrated as directly recording the audio frequencies, they can be used instead for recording a carrier modulated by the audio signal, which carrier would be demodulated for playback.

In place of the vacuum tubes, transistors could be used without altering the function of the associated circuits.

The neon lamp is actuated well in advance of the tape ends and remains lit, so that during recording the operator may choose an appropriate reversal point depending upon the program material. A relay should operate automatically before reaching the very ends of the tape in case the operator neglects the changeover. During playback the reversals preferably take place automatically at the points where changeover was made in the recording process.

In regards to reducing the reflected capacitance across the head to the lowest possible value, it may be desirable to omit 458 and/or 466 and obtain an equivalent effect elsewhere in the circuit.

If no additional grid bias is desired from the clamping circuit, 505 may be reduced to zero, and 506 eliminated.

A.G.C. line 935 may similarly be connected to 468, or to both 468 and 488.

The following are objects of the invention;

1. Circuit and head combination that gives high output and signal-noise ratio even with a very narrow track width, allowing more tracks on a given width of tape.
2. Single circuits that give adequate correction for video (and radar) recording, using direct recording.
3. Faithful reproduction of recorded waveforms over a video frequency spectrum.
4. Economy of tape usage as well as of mechanism and of circuitry to give a practical home recorder for video.
5. Stabilization of picture signal that enables the use of an inexpensive drive.
6. Stabilization that tolerates considerable flutter during recording and/or playback.
7. Treatment of signal that compensates for defects in the magnetic recording and/or playback process of a video signal including hum pickup, inherent tape noise, amplifier noise, deficiencies of heads and tapes, rate of change playback effects, phase shifts, etc.
8. Reproduction of a steady picture from a video signal which has a relatively high degree of frequency or amplitude modulation due to drive instability.

The time constants of the RC and L networks in the amplifier circuits of FIGS. 7, 10 and 11 and in the stabilizing circuits of FIGS. 12 and 13 are important in producing the desired results in recording and reproduction of the picture. These may be calculated readily from the tabulated values, and important limits of these are indicated in some of the appended claims.

It will be apparent that many modifications and variations may be effected without departing from the scope of the novel concepts of this invention.

DESCRIPTION OF FIGS. 16 and 17

FIG. 16 corresponds to the third figure of my U.S. Pat. No. 3,502,795 issued Mar. 24, 1970, and FIG. 17 is based on the description of said patent at column 4, lines 19–30.

The following description corresponds identically to the description of the third figure of U.S. Pat. No. 3,502,795 except for the change of figure number and reference numerals.

Description of FIG. 16 from U.S. Pat. No. 3,502,795

Referring to FIG. 16, the reference numeral 16-60 may designate a suitable source of color signals such as the video circuits of a conventional color television receiver. By way of example, the component 16-60 may provide a signal varying in accordance with the red color component of a visual image at line 16-61, the green component at line 16-62 and blue color component at line 16-63. In a conventional color television set, these signals may be supplied directly to respective control grids of a multigun color television tube as indicated by lines 16-64-16-66. The same color signals may be supplied to amplifier components 16-71, 16-72 and 16-73 which during recording operation are conditioned to supply suitable recording currents to the windings of the respective video head units 16-16, 16-17 and 16-18. Thus amplifier component 16-71 supplies recording current to windings 16-57' and 16-58' in series so as to produce a longitudinally directed field at the longitudinal gap fluctuating in accordance with the red component of a visual image. The amplifier component 16-72 produces a recording current in the windings 16-75 and 16-76 of head unit 16-17 in series to produce a longitudinal field component at the gap varying in accordance with the green color component of the visual image. The amplifier component 16-73 produces a recording current in the windings 16-27 and 16-28 in series to produce a longitudinal field component at the gap of the head unit 16-18 varying in accordance with the blue color component of the visual image. At the same time, suitable audio sources 16-81 and 16-82 may supply audio recording currents to windings 16-41 and 16-42 in series, and windings 16-43 and 16-44 in series, respectively. The windings 16-41 and 16-42 may be connected so as to produce aiding magnetomotive forces with respect to the loop magnetic circuit including the core 16-47, pole face 16-32a, portion 16-30a, and pole face 16-32b. Similarly, the windings 16-43 and 16-44 may be connected so as to produce aiding magnetomotive forces with respect to the loop magnetic flux path including the core 16-48, pole face 16-33a, portion 16-30b, and pole face 16-33b.

Suitable video and audio biasing means are preferably provided as indicated by components 16-91 and 16-92 in FIG. 16. While any conventional biasing arrangement may be employed by way of example, cross field bias windings may be located as indicated at 16-93, 16-94 and 16-95 in FIG. 16 for the video head units 16-16, 16-17 and 16-18, and may operate on the cross field principle in conjunction with windings 16-57'-16-58', 16-75-16-76 and 16-27-16-28, respectively. Bias windings 16-100 and 16-101 are indicated for the audio head units 16-32 and 16-33 in FIG. 16. With respect to the longitudinally disposed video head units 16-16-16-18, during forward movement of the record medium 16-20, windings 16 -93, 16-94 and 16-95 are energized with high frequency constant amplitude bias current of one phase from bias source 16-91 for example; while during reverse movement of the record medium 16-20, windings 16-93, 16-94 and 16-95 are energized with high frequency bias current of opposite phase from the bias source 16-91. Since the audio heads units 16-32 and 16-33 are laterally directed and do not utilize cross field type biasing, the energization of bias windings 16-100 and 16-101 need not be altered in dependence on the direction of movement of the record medium. Preferably, the bias currents are of a frequency at least several times greater than the highest frequency component to be recorded by the associated head and are of a frequency so as not to interfere or beat with the frequency components being recorded.

Description of FIG. 17 from U.S. Pat. No. 3,502,795

By way of example, components 16-91 and 16-92 may comprise frequency multipliers 17-10 and 17-11, FIG. 17, coupled to the horizontal deflection generator indicated at 17-12 of a conventional color television set as represented by component 16-60, FIG. 16. For audio bias frequency, the horizontal line rate frequency of 15,750 cycles per second may be multiplied by a factor of the order of 5, while for the video circuits, the horizontal line rate may be multiplied by a factor of the order of 200. The components 16-91 and 16-92 may include suitable filtering and amplification means at the output of the frequency multipliers as indicated at 17-14 and 17-15 in FIG. 17 so as to provide substantially sine wave constant amplitude bias currents to the respective head units.

I claim as my invention:

1. In a video transducer system comprising a magnetic transducer head for scanning cooperation with a magnetic record medium, a video recording circuit connected with said transducer head during recording operation for supplying a video signal to be recorded to said transducer head and for producing a video signal magnetic field acting on the record medium to record the video signal thereon, and a high frequency bias circuit connected with said transducer head during recording operation for producing a high frequency bias magnetic field which is superimposed on the video signal magnetic field to assist in the recording of the video signal, wherein the improvement comprises means determining the bias frequency of said high frequency bias magnetic field so as to avoid beat notes with frequency components of the video signal.

2. A system according to claim 1 wherein the video recording circuit supplies a video signal having a given horizontal line frequency, and said determining means produces a bias frequency equal to a multiple of the horizontal line frequency of the video signal.

3. A system according to claim 2 wherein said determining means produces a bias frequency equal to a multiple of the order of 200 times said horizontal line frequency.

4. A system according to claim 2 wherein a video color signal source includes a horizontal deflection signal, and said determining means comprises a frequency multiplier connected to said source for receiving said horizontal deflection signal and connected to said transduced head for supplying a high frequency bias signal thereto with a frequency equal to a multiple of the frequency of said horizontal deflection signal.

5. A video transducer system comprising a magnetic transducer head arranged to scan a moving magnetic record tape for recording a video signal along a longitudinal channel thereof, a video recording circuit for supplying a video signal to be recorded to said magnetic transducer head, and a high frequency bias circuit for generating a megacycle frequency bias signal and for supplying the same to said magnetic transducer head during recording, said video recording circuit providing a bias frequency value of from 2 to 8 megacycles per second avoiding beat notes with the video signal, and superimposed on the video signal to assist recording thereof.

6. A television recording system comprising circuit means for receiving video signal information together with audio signal information with the video signal information including a synchronizing signal at a horizontal line frequency, audio and video signal recording means for recording the audio and video signal information and coupled to said circuit means for receiving said audio and video signal information therefrom, and means coupled to said audio and video signal recording means and to said receiving means for generating a high frequency bias signal having a frequency synchronized with the frequency of said synchronizing signal for producing a bias frequency field component at said recording means which is mixed with a signal field generated by said recording means to assist in the recording of the signal information.

* * * * *